(12) United States Patent
Ramstad

(10) Patent No.: US 8,619,132 B2
(45) Date of Patent: Dec. 31, 2013

(54) WIDE COLOR GAMUT ANAGLYPHS

(75) Inventor: Monte Ramstad, Cannon Falls, MN (US)

(73) Assignee: Monte Ramstad, Cannon Falls, MN (US)

( * ) Notice: Subject to any disclaimer, the term of this patent is extended or adjusted under 35 U.S.C. 154(b) by 812 days.

(21) Appl. No.: 12/508,195

(22) Filed: Jul. 23, 2009

(65) Prior Publication Data

US 2009/0284586 A1    Nov. 19, 2009

Related U.S. Application Data

(63) Continuation of application No. PCT/US2008/000835, filed on Jan. 23, 2008.

(60) Provisional application No. 60/881,863, filed on Jan. 23, 2007.

(51) Int. Cl.
*H04N 13/04* (2006.01)
*H04N 17/00* (2006.01)

(52) U.S. Cl.
USPC ............. 348/60; 345/419; 345/590; 382/154

(58) Field of Classification Search
USPC .......................................................... 348/60
See application file for complete search history.

(56) References Cited

U.S. PATENT DOCUMENTS

| | | | |
|---|---|---|---|
| 1,422,527 A | 7/1922 | Berger | |
| 2,135,197 A | 11/1938 | Norling | |
| 2,136,303 A | 11/1938 | Lumiere | |
| 2,568,327 A | 9/1951 | Dudley | |
| 2,623,433 A | 12/1952 | Stipek | |
| 3,240,138 A | 3/1966 | Goddard | |
| 3,256,776 A | 6/1966 | Land et al. | |
| 3,507,549 A | 4/1970 | Land | |
| 3,776,725 A | 12/1973 | McCann et al. | |
| 3,820,874 A | 6/1974 | Scarpetti | |
| 4,009,951 A | 3/1977 | Ihms | |
| 4,134,644 A | 1/1979 | Marks et al. | |
| 4,264,926 A | 4/1981 | Etra | |
| 4,620,770 A | 11/1986 | Wexler | |
| 4,734,756 A | 3/1988 | Butterfield et al. | |
| 4,905,081 A | 2/1990 | Morton | |
| 5,398,131 A | 3/1995 | Hall et al. | |

(Continued)

FOREIGN PATENT DOCUMENTS

| JP | 06-092009 | 4/1994 |
|---|---|---|
| JP | 06-191084 | 7/1994 |

(Continued)

OTHER PUBLICATIONS

Hiroshi Harashima, 3-Dimensional Image and Human Science, 2001, Ohmsha, Japan, ISBN 4-274-02432-6.

*Primary Examiner* — Tung Vo
*Assistant Examiner* — Obafemi Sosanya

(57) ABSTRACT

Four primary colors may be used to render anaglyphs with wide color gamuts. The first image of a stereoscopic pair may be rendered in three primary colors while the second image of a stereoscopic pair may be rendered in a fourth primary color. Retinal rivalry may be avoided in an anaglyph by balancing the brightness contrasts of the first and second images for like subject matter. The retinal rivalry may be measured and controlled in anaglyphs by selecting values of a retinal rivalry color coordinate.

18 Claims, 11 Drawing Sheets

(56) References Cited

U.S. PATENT DOCUMENTS

| | | | |
|---|---|---|---|
| 5,491,646 A | 2/1996 | Erskine | |
| 5,661,518 A | 8/1997 | Palm et al. | |
| 6,037,971 A | 3/2000 | McLaine et al. | |
| 6,335,755 B1 | 1/2002 | McLaine et al. | |
| 6,389,236 B1 | 5/2002 | Western | |
| 6,603,442 B1 * | 8/2003 | Hong | 345/7 |
| 6,624,842 B2 | 9/2003 | McLaine et al. | |
| 6,631,205 B1 | 10/2003 | Melen et al. | |
| 6,678,323 B2 | 1/2004 | Tam et al. | |
| 6,687,003 B1 | 2/2004 | Sorensen et al. | |
| 6,748,105 B1 | 6/2004 | Mancuso et al. | |
| 6,956,964 B2 | 10/2005 | Lee et al. | |
| 7,001,021 B2 | 2/2006 | Jorke | |
| 7,018,045 B2 * | 3/2006 | Tomita | 353/31 |
| 7,130,488 B2 | 10/2006 | Harrington et al. | |
| 7,215,792 B2 | 5/2007 | Sharma et al. | |
| 7,379,588 B2 | 5/2008 | Loce et al. | |
| 2002/0021832 A1 * | 2/2002 | Dawson | 382/154 |
| 2002/0085089 A1 | 7/2002 | McLaine et al. | |
| 2004/0124766 A1 | 7/2004 | Nakagawa et al. | |
| 2004/0223219 A1 | 11/2004 | Tooyama | |
| 2004/0233465 A1 | 11/2004 | Coyle et al. | |
| 2006/0214875 A1 | 9/2006 | Sonehara | |

FOREIGN PATENT DOCUMENTS

| | | |
|---|---|---|
| KR | 10-2001-0071198 | 7/2001 |
| KR | 10-2002-0027414 | 4/2002 |
| WO | 02/13141 A1 | 2/2002 |
| WO | 2005/121876 A1 | 12/2005 |
| WO | 2008/061511 A1 | 5/2008 |

* cited by examiner

WIDE COLOR GAMUT ANAGLYPHS

CROSS-REFERENCE TO RELATED APPLICATIONS

This application is a continuation of PCT/US2008/000835 filed Jan. 23, 2008, which claims priority to U.S. Ser. No. 60/881,863 filed Jan. 23, 2007, which applications are hereby incorporated by reference herein.

TECHNICAL FIELD

The technical field relates to imaging and viewing in three-dimensions.

BACKGROUND

Stereoscopic images generally consist of two images which are related by a small change in the lateral perspective. When viewed through an enabling apparatus, stereoscopic images may provide the perception of stereoscopic depth. Anaglyphs are stereoscopic images wherein different sets of primary colors are used to render the first and second images of the stereo pair. Usually, the spectra of the first and second images do not overlap significantly. Then the first and second images may be viewed selectively using two complementary color viewing filters. The first viewing filter $F_1$ may be used to view the first image while the second viewing filter $F_2$ may be used to view the second image. The first filter substantially transmits the primary colors of the first image and blocks the primary colors of the second image. The second filter substantially transmits the primary colors of the second image and blocks the primary colors of the first image.

Anaglyphs are often rendered in three primary colors where the first image is rendered in two primary colors while the second image is rendered in one primary color. In red/cyan anaglyphs, the first image is rendered in green and blue primary colors while the second image is rendered in a red primary color. Other types of anaglyphs include blue/yellow and green/magenta anaglyphs. Herein these anaglyphs are called three-color anaglyphs.

Anaglyphs are often used to display stereoscopic images due to their relatively low cost and wide compatibility with display devices. However, conventional anaglyphs have some well known disadvantages. Firstly, conventional anaglyphs generally exhibit a reduced color gamut when viewed through the colored viewing filters. Secondly, conventional anaglyphs generally exhibit retinal rivalry which may cause user discomfort. The prior art contains many methods to improve the color gamut of anaglyphs. The prior art also contains many methods to reduce the retinal rivalry in anaglyphs. However, these anaglyphs still have reduced color gamuts and exhibit retinal rivalry.

It is commonly known that viewing a subject through colored filters may reduce the observed color gamut of the subject. In general, a color filter which transmits only a single primary color may not allow any color hue to be fully perceived through the filter. For example, an image rendered in a pure red primary color may appear to be nearly a grayscale image when viewed through the red filter.

On the other hand, a filter which transmits two primary colors may allow only the hues associated with the two primary colors to be perceived through the filter. The hue consisting of both primary colors may appear to be nearly a gray color through the filter. For example, a cyan filter (which transmits green and blue light) may allow only blue and green hues or blue and greenish-yellow hues to be perceived through the filter depending on how close the green primary color is to yellow. An image rendered in pure cyan hues may appear to be nearly a grayscale image when viewed through a cyan filter. These phenomena may be confirmed by viewing a digital color spectrum through pure cyan and pure red filters. Software programs for editing digital images often provide a suitable digital color spectrum in their color selection tools.

Since the second image in an anaglyph, is generally perceived as a grayscale image, the color gamut observed in a stereo view of an anaglyph is generally similar to the color gamut of the first image rendered in two primary colors. The first image in an anaglyph generally contributes more to color perception than the second image.

From these observations, one might expect that only blue and yellowish-green hues may be perceived in red/cyan anaglyphs. However, additional color hues are often visible in conventional red/cyan anaglyphs.

One common method of creating red/cyan anaglyphs is to combine the green and blue primary channels of the first image with the red primary channel of the second image. This type of anaglyph is often called a "true-color" anaglyph. Surprisingly, red and cyan hues may be perceived in some true-color anaglyphs when viewed through red and cyan viewing filters. In other words, while the single filters do not allow red or cyan hues to be perceived, the stereo view through the two filters may allow red and cyan hues to be perceived. However, the red and cyan hues are generally accompanied by large amounts of retinal rivalry. Similar phenomena occur in analogous blue/yellow and green/magenta true-color anaglyphs.

True-color anaglyphs generally to have too much retinal rivalry for comfortable viewing. Therefore many methods have been developed in the prior art to produce anaglyphs with less retinal rivalry than observed in true-color anaglyphs. In order to observe less retinal rivalry, anaglyphs are often constructed from images with modified colors. These color modifications may reduce the retinal rivalry observed in the anaglyph, but may also reduce the spectrum or saturation of hues perceived in the anaglyph. Herein these anaglyphs with modified colors and rendered in three primary colors are called partial-color anaglyphs.

There are various editing operations which may be applied to stereoscopic images prior to constructing an anaglyph which are known to reduce retinal rivalry. These include de-saturation of hues and hue substitution. Many methods involve local editing of an image so that the editing functions vary throughout an image. These are very labor intensive and expensive methods to prepare anaglyphs. A particular method of the prior art may cause an average reduction of retinal rivalry in a stereo view while patches of high retinal rivalry remain scattered throughout the stereo view. However, the prior art does not provide a method to reduce the retinal rivalry to arbitrarily low levels for any distribution of initial color content in a stereoscopic image. The prior art lacks a working theory of how to avoid retinal rivalry when producing partial-color anaglyphs.

The conditions which are required to avoid retinal rivalry in color anaglyphs are not described in the prior art. Generally, the prior art contemplates a compromise between the color gamut and the level of retinal rivalry observed in an anaglyph. It is widely believed that retinal rivalry is necessarily present to some degree in color anaglyphs. In order words, it is widely believed that all color anaglyphs have more retinal rivalry than grayscale images. Most efforts of the prior art have been directed toward improving the color gamut of partial-color anaglyphs while accepting a reduced but substantial amount of retinal rivalry.

Methods exist in the prior art to increase the color gamut of anaglyphs by using leaky viewing filters. It is widely known that the range of perceived hues in partial-color anaglyphs may be expanded to some degree by allowing one or both of the viewing filters to partially transmit or leak a small amount of additional primary colors through the filters. For example, a red filter which also transmits a small amount of green light may allow a dark green hue and an unsaturated red hue to be perceived through the red filter. Or a cyan filter which also transmits a small amount of red light may allow a dark red hue and an unsaturated cyan hue to be perceived through the filter.

Transmitting part of the primary colors of the opposite image through the viewing filters may cause the user to see ghost images or double images in the stereo view. The double images may reduce the ability of the user to fuse the stereo pair and may reduce the perceived stereoscopic depth in the stereo view. Therefore, when using leaky filters, the benefit of the extra hues created by the leak must be balanced against the disadvantage of perceiving less stereoscopic depth.

Conventional cyan filters for viewing red/cyan anaglyphs are often designed to leak a small amount of a red primary color through the filter. This allows a weak reddish hue to be perceived through the cyan filter. However the leaked red primary color creates a ghost of the second image in the view of the first image. Furthermore since the second image is often offset from the first image due to stereoscopic parallax, the red light from the second image is not always at the proper location to contribute correctly to the color of the first image. Similar disadvantages occur when using leaky filters with blue/yellow and green/magenta anaglyphs.

The prior art contains methods to predict the color gamut observed in anaglyphs viewed through leaky filters using conventional color models such as the CIE (International Commission on Illumination) RGB color models. The CIE color models were developed for red, green and blue primary colors. However, it is clear that color perception is drastically changed by color viewing filters. For example, a red viewing filter may change a red color, which is considered a dark color in conventional color models, into a white color which is a bright, unsaturated color. Therefore, applying conventional color model calculations to predict the color gamut perceivable through color filters has questionable meaning. Furthermore, the color gamut perceivable in an anaglyph depends on the amount and distribution of retinal rivalry. In fact, the effects of retinal rivalry on the perceived color gamut is often greater than the effect of leaking complementary colors through the filters. This is a further reason that color gamut calculations based on conventional color models have limited meaning when applied to conventional anaglyphs.

Grayscale anaglyphs are anaglyphs which are constructed from grayscale versions of stereoscopic images. The grayscale values of the first image are displayed in two primary colors while the grayscale values of the second image are displayed in the remaining primary color. A grayscale anaglyph may appear grayscale when viewed through the anaglyph viewing filters. Grayscale anaglyphs have the advantage of having nearly no perceivable retinal rivalry, but have the disadvantage of not providing colored stereo views. Herein, an anaglyph is considered to be a color anaglyph unless otherwise stated.

BRIEF SUMMARY OF THE INVENTION

One embodiment of the present invention describes a method of creating anaglyphs from stereoscopic images comprising a stereoscopic image including a first image and a second image and the first image represented by two or more color coordinates $\{P_1, \ldots, P_m\}_1$ and the second image represented by two or more color coordinates $\{P_1, \ldots, P_m\}_2$ and transforming the coordinates $\{P_1, \ldots, P_m\}_2$ into brightness coordinates $\{Q_1\}_2$ using a brightness transformation $G_B$ including brightness transformation data and a first image of an anaglyph represented by the coordinates $\{P_1, \ldots, P_m\}_1$ and a second image of the anaglyph represented the coordinates $\{Q_1\}_2$ whereby the brightness contrast may be balanced in the first and second images of the anaglyph.

An alternative embodiment of the present invention describes a method of creating anaglyphs from stereoscopic images comprising a stereoscopic image including a first image and a second image and the first image represented by two or more color coordinates $\{P_1, \ldots, P_s\}_1$ and the second image represented by two or more color coordinates $\{P_1, \ldots, P_s\}_2$ and projecting the coordinates $\{P_1, \ldots, P_s\}_1$ into two or more color coordinates $\{P_1, \ldots, P_m\}_1'$ using a projection transformation $G_P$ and projecting the coordinates $\{P_1, \ldots, P_s\}_2$ into two or more color coordinates $\{P_1, \ldots, P_m\}_2'$ using the projection transformation $G_P$, the transformation $G_P$ including projection data and transforming the coordinates $\{P_1, \ldots, P_m\}_2'$ into a brightness coordinate $\{Q_1\}_2'$ coordinate using a brightness transformation $G_B$, the transformation $G_B$ including brightness transformation data and a first image of an anaglyph represented by coordinates $\{P_1, \ldots, P_m\}_1$ and a second image of the anaglyph represented by coordinates $\{Q_1\}_2$ whereby the brightness contrast may be balanced in the first and second images of the anaglyph.

An alternative embodiment of the present invention describes a method of creating anaglyphs from stereoscopic images comprising a stereoscopic image including a first image and a second image and the first image projectable into two or more color coordinates $\{P_1, \ldots, P_m\}_1$ and the second image projectable into two or more color coordinates $\{P_1, \ldots, P_m\}_2$ and transforming the coordinates $\{P_1, \ldots, P_m\}_2$ into brightness coordinates $\{Q_{1B}\}_2$ using a brightness transformation $G_B$ including brightness transformation data and transforming the coordinates $\{Q_{1B}\}_2$ into coordinates $\{Q_1\}_2$ using a rivalry transformation $G_Z$ including rivalry data $Z_s$ and a first image of an anaglyph represented by coordinates $\{P_1, \ldots, P_m\}_1$ and a second image of the anaglyph represented by coordinates $\{Q_1\}_2$ whereby the color gamut of a stereo view of the anaglyph with balanced brightness may be expanded with a controlled amount of retinal rivalry.

An alternative embodiment of the present invention describes a method of creating anaglyphs from stereoscopic images comprising a stereoscopic image including a first image and a second image and the first image projectable into two or more color coordinates $\{P_1, \ldots, P_m\}_1$ and the second image projectable into two or more color coordinates $\{P_1, \ldots, P_m\}_2$ and transforming the coordinates $\{P_1, \ldots, P_m\}_2$ into masked coordinates $\{P_{1M}, \ldots, P_{mM}\}_2$ using a masking transformation $G_M$ including a mask image $\{M_1, \ldots, M_m\}$ and transforming the coordinates $\{P_{1M}, \ldots, P_{mM}\}_2$ into brightness coordinates $\{Q_1\}_2$ using a brightness transformation $G_B$ including brightness transformation data and a first image of an anaglyph represented by coordinates $\{P_1, \ldots, P_m\}_1$ and a second image of the anaglyph represented by coordinates $\{Q_1\}_2$ whereby the brightness contrast may be balanced in the first and second images of the anaglyph.

An alternative embodiment of the present invention describes a method of displaying stereoscopic images comprising a stereoscopic image including a first image and a second image and a display apparatus providing three or more primary colors $\{P_1, \ldots, P_m\}$ and a primary color $Q_1$ and the primary colors $\{P_1, \ldots, P_m\}$ including a red, green, and blue primary color and the spectra of the primary colors $\{P_1, \ldots,$ $P_m$} not substantially overlapping the spectra of the primary color $Q_1$ and displaying the first image using the primary colors {$P_1, \ldots, P_m$} and displaying the second image using the primary color $Q_1$.

An alternative embodiment of the present invention describes an apparatus for viewing stereoscopic images comprising a first filter and a second filter and the spectra of the first filter substantially overlapping the spectra of three primary colors {$P_1, P_2, P_3$} and the spectra of the second filter substantially overlapping the spectra of a primary color $Q_1$ and the spectra of the second filter not substantially overlapping the spectra of the first filter.

An alternative embodiment of the present invention describes a method of calibrating an apparatus for displaying stereoscopic images comprising a display apparatus providing two or more primary colors {$P_1, \ldots, P_m$} and a primary color $Q_1$ and a first viewing filter $F_1$ substantially transmitting the primary colors {$P_1, \ldots, P_m$} and blocking the primary color $Q_1$ and a second viewing filter $F_2$ substantially transmitting the primary color $Q_1$ and blocking the primary colors {$P_1, \ldots, P_m$} and an image projectable into two or more color coordinates {$P_1, \ldots, P_m$}$_1$ and transforming the coordinates {$P_1, \ldots, P_m$}$_1$ into brightness coordinates {$Q_1$}$_1$ using a brightness transformation $G_B$ including brightness transformation data and displaying the coordinates {$P_1, \ldots, P_m$}$_1$ using the primary colors {$P_1, \ldots, P_m$} and displaying the coordinates {$Q_1$}$_1$ using the primary color $Q_1$ and viewing the first image in the primary colors {$P_1, \ldots, P_m$} through the first filter $F_1$ and viewing the first image in the primary color $Q_1$ through the second filter $F_2$ and comparing the brightness contrast of the first image viewed through the first and second filters and selecting new brightness transformation data whereby the brightness transformation data which balances the brightness contrast of anaglyphs may be determined for the display apparatus.

An alternative embodiment of the present invention describes a method of measuring the retinal rivalry in anaglyphs comprising an anaglyph including a first image and a second image and the first image represented by two or more color coordinates {$P_1, \ldots, P_m$} and the second image represented by a color coordinates $Q_1$ and transforming the coordinates {$P_1, \ldots, P_m$} into brightness coordinates $Q_{1B}$ using a brightness transformation $G_B$ including brightness transformation data and the retinal rivalry Z a function of $Z_s$, $Z=G(Z_s)$ and $Z_s=(Q_{1B}-Q_1)/Q_{1B}$ for like subject matter in the first and second images.

The present invention is directed to the use of primary colors and special filters to render, display and view digital stereoscopic images in an anaglyph format with a wide color gamut and without retinal rivalry or with a controlled amount of retinal rivalry in the stereo view of the anaglyph.

Some embodiments of the present invention include methods to create and display anaglyphs with little or no perceivable retinal rivalry. The present invention identifies the color property which the visual system uses to process stereoscopic information. Herein this stereoscopic color property is called the brightness contrast or the brightness. The brightness may be considered a carrier of the brightness contrast in the image. When the brightness contrast is balanced for like subject matter in a stereo view, retinal rivalry may be essentially absent and full stereoscopic depth (true-depth) may be perceived in a stereo view. Herein anaglyphs with balanced brightness contrast are sometimes said to have balanced brightness even though the absolute brightness may be different in the left and right views. Herein an anaglyph with balanced brightness is sometimes called a true-depth anaglyph or a balanced-brightness anaglyph.

Some embodiments of the present invention include methods to create and display anaglyph images using four or more primary colors. Herein, this type of anaglyph is sometimes called a four-color anaglyph even though it may consist of more than four primary colors. A stereo view of a four-color anaglyph may be viewed through viewing filters where a first filter transmits the first image and blocks the second image and a second filter transmits the second image and blocks the first image.

Some embodiments of the present invention include methods to create and display three-color anaglyphs with balanced brightness as well as four-color anaglyphs with balanced brightness. As the retinal rivalry in an anaglyph is reduced, the color gamut observed in the stereo view of an anaglyph may approach the color gamut of the first image viewed through the first viewing filter. Therefore, the color gamut of a balanced-brightness, three-color anaglyph may be approximately a one-dimensional line segment in a CIE (International Commission on Illumination) xy diagram connecting the two primary colors of the first image. The color gamut of a balanced-brightness, three-color anaglyph may contain roughly half the hues in a color wheel. The color gamut of a balanced-brightness, four-color anaglyph may be approximately bounded by a two-dimensional triangle in a CIE xy diagram defined by the three primary colors of the first image. The color gamut of a balanced-brightness, four-color anaglyph may contain roughly all the hues a color wheel.

DETAILED DESCRIPTION OF THE INVENTION

Four-Color Anaglyphs

Figure 1:
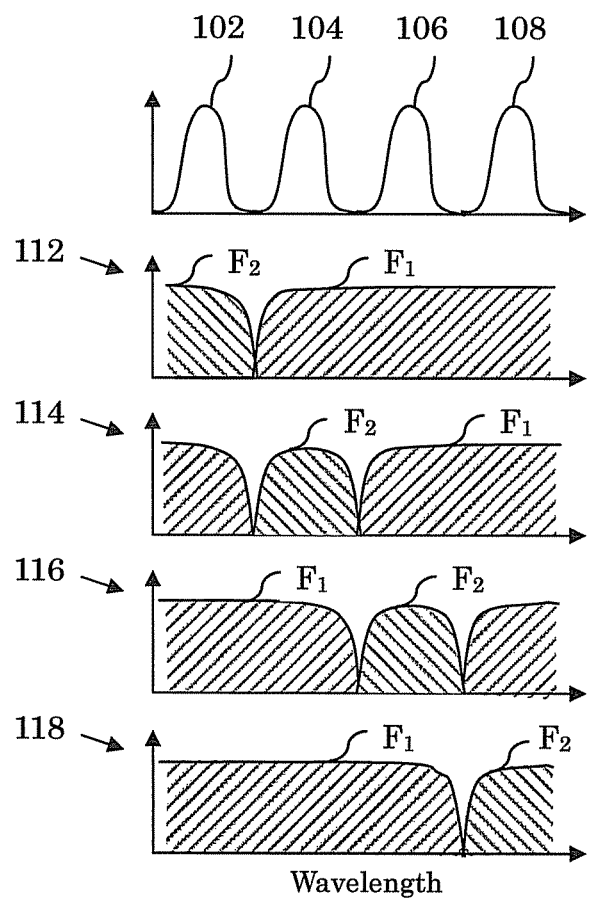
FIG. 1 depicts representative spectra of four primary colors. Also depicted are the spectra of two viewing filters $F_1$ and $F_2$ for different types of four-color anaglyphs of the present invention.

Some embodiments of the present invention include methods to display anaglyphs using four or more primary colors. The first image may be rendered in three or more independent primary colors $\{P_1, \ldots, P_m\}$, while the second image may be rendered in one primary color $Q_1$. Herein this type of anaglyph will be called a four-color anaglyph even though it may consist of more than four primary colors. Herein the primary colors $\{P_1, \ldots, P_m\}$ consist of independent primary colors unless otherwise stated. A dependent primary color is substantially equivalent to a combination of the other primary colors. For example in CMYK printing primary colors, black K is a dependent primary color because black may be obtained from a combination of cyan C, magenta M, and yellow Y primary colors. Subtractive primary colors may be transformed into additive primary color coordinates and are included in the scope of present invention. Dependent primary colors are also included in the scope of the present invention.

In some embodiments of the present invention a pair of viewing filters is provided for viewing the four-color anaglyphs. A first viewing filter $F_1$ substantially transmits the primary colors $\{P_1, \ldots, P_m\}$ and blocks the primary color $Q_1$. The second viewing filter $F_2$ substantially transmits the primary color $Q_1$ and blocks the primary colors $\{P_1, \ldots, P_m\}$. It is within the scope of the present invention for the first and/or second filters to leak a small amount of the luminance of the blocked primary colors through the viewing filters.

In some embodiments of the present invention, the spectrum of the primary color $Q_1$ does not substantially overlap the spectra of the primary colors $\{P_1, \ldots, P_m\}$. This generally allows the first and second images of the anaglyph to be selectively viewed through first and second color filters respectively.

In some embodiments of the present invention, the spectra of the primary color $Q_1$ may overlap some of the spectra of the primary colors $\{P_1, \ldots, P_m\}$ or be equal to the spectra of one of the primary colors $P_i$. In this embodiment, the polarization state of the primary colors $\{P_1, \ldots, P_m\}$ may be opposite to the polarization state of the primary color $Q_1$. Then, the first and second images may be selectively viewed using first $F_1$ and second $F_2$ polarized filters where filter $F_1$ transmits light having the polarization state of the primary colors $\{P_1, \ldots, P_m\}$ and where filter $F_2$ transmits light having the polarization state of the primary color $Q_1$.

In some embodiments of the present invention, the first and second images of an anaglyph may be superimposed on a surface. In other embodiments of the present invention, the first image may be displayed on a first region of a first surface and the second image may be displayed on a second region of a second surface where the first and second regions do not overlap. Examples are: two images displayed side-by-side; or two images displayed in a head mounted display where each eye may view a separate display surface.

The color gamut observed in the stereo view of an anaglyph may approach the color gamut of the first image viewed through the first viewing filter as the retinal rivalry approaches zero. The color gamut of the first image of a four-color anaglyph viewed through the first filter may be a two-dimensional triangle in a CIE xy diagram. Herein the color gamut of an image is considered to be the color gamut of the set of primary colors used to render the image. The color gamut of a set of primary colors is the set of colors which may be rendered using the set of primary colors. The color gamut of a set of primary colors may be depicted by plotting the xy chromacity coordinates of the primary colors on a CIE chromacity diagram. b A property of a CIE chromacity diagram is that the color gamut of a set of primary colors can be depicted by connecting the points representing the primary colors with line segments in the chromacity diagram. The color gamut includes the area bounded by the line segments.

In some embodiments of the present invention, anaglyphs may be displayed by digital display devices including digital projector, LCD displays, and CRT displays. In other embodiments, the anaglyphs may be displayed on print media including opaque and transparent print media.

FIG. 1 depicts non-overlapping spectra 102, 104, 106, and 108 representing four primary colors. The first spectra 102 may be a blue primary color. The second spectra 104 may be a cyan or green primary color. The third spectra 106 may be a green, yellow, orange or red primary color. The fourth spectra 108 may be a red or far-red primary color. The primary color $Q_1$ may be represented by any of the four spectra in different embodiments of the present invention. In other words, primary color $Q_1$ may be blue, cyan, green, yellow, orange, red or far-red. The primary colors $\{P_1, P_2, P_3\}$ may be represented by the other three spectra which generally may include red, green, and blue primary colors, but may include yellow, green and blue primary colors, or orange, green, and blue primary colors, or red, green and cyan primary colors. The first viewing filter $F_1$ of each embodiment transmits the primary colors $\{P_1, P_2, P_3\}$ while the second viewing filter $F_2$ transmits the primary color $Q_1$.

Figure 2:
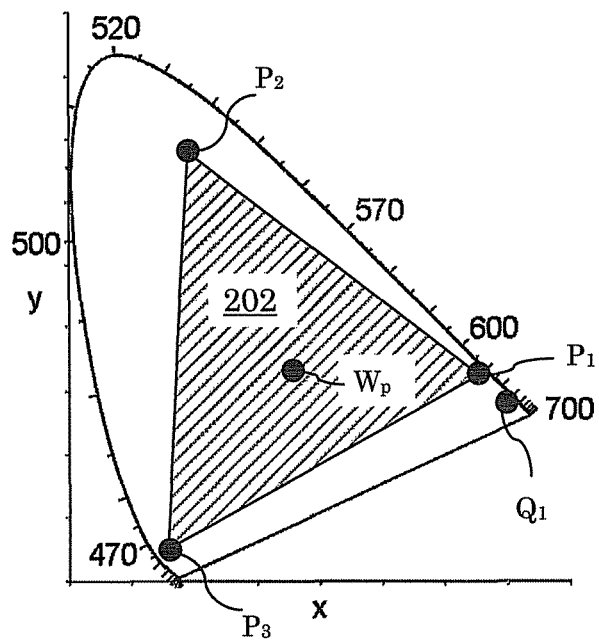
FIG. 2 depicts a representative color gamut of a true-depth anaglyph in which the second image of the anaglyph is rendered in a red $Q_1$ primary color and the first image is rendered in red $P_1$, green $P_2$, and blue $P_3$ primary colors.

In one embodiment of the present invention, the primary color $Q_1$ may be red. FIG. 1 depicts the transmission spectra of filters $F_1$ and $F_2$ in plot 118. The red primary color $Q_1$ is represented by the fourth spectra 108. The primary color $P_1$ may be red, orange or yellow and is represented by the third spectra 106. Primary color $P_2$ may be a green and is represented by the second spectra 104. Primary color $P_3$ may be a blue and is represented by the first spectra 102. FIG. 2 depicts the color gamut 202 of an anaglyphs of the present embodiment in a CIE xy diagram where the primary color $P_1$ is red. The color gamut of the anaglyphs may be represented by the triangle formed by the points $P_1$, $P_2$, and $P_3$ representing the primary colors of the first image of the anaglyph. The point $Q_1$ represents the primary color of the second image. The point $W_p$ represents the conventional white point.

Figure 15:
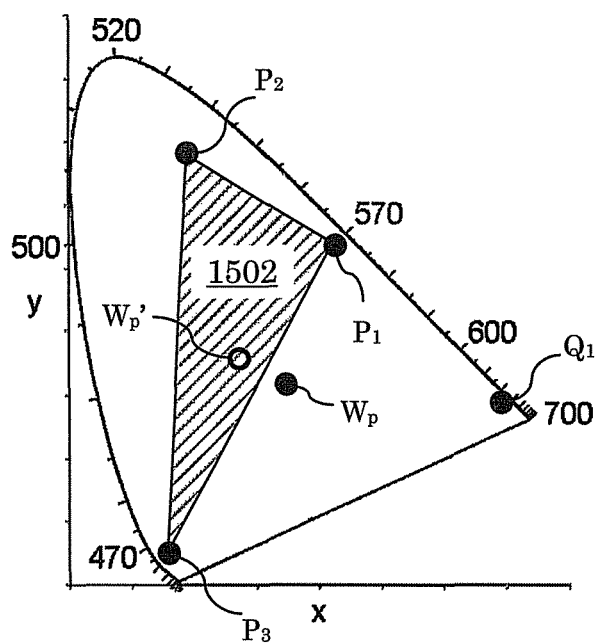
FIG. 15 depicts a representative color gamut of a true-depth anaglyph in which the second image of the anaglyph is rendered in a red $Q_1$ primary color and the first image is rendered in yellow $P_1$, green $P_2$, and blue $P_3$ primary colors.

In another embodiment, the primary color $P_1$ may be yellow or orange. FIG. 15 depicts the color gamut 1502 of an anaglyph of the present embodiment in a CIE xy diagram where the primary color $P_1$ is yellow. The color gamut of the anaglyphs may be represented by the triangle formed by the points $P_1$, $P_2$, and $P_3$ representing the primary colors of the first image of the anaglyph. The point $Q_1$ represents the primary color of the second image. The point $W_p$ represents the conventional white point. The point $W_p'$ represents the approximate location of the apparent white point viewed through the first viewing filter. This embodiment may include images printed in high-fidelity inks which contain four or more independent ink spectra. For example, high-fidelity inks may include a cyan, magenta, yellow, green and orange primary colors.

Figure 3:
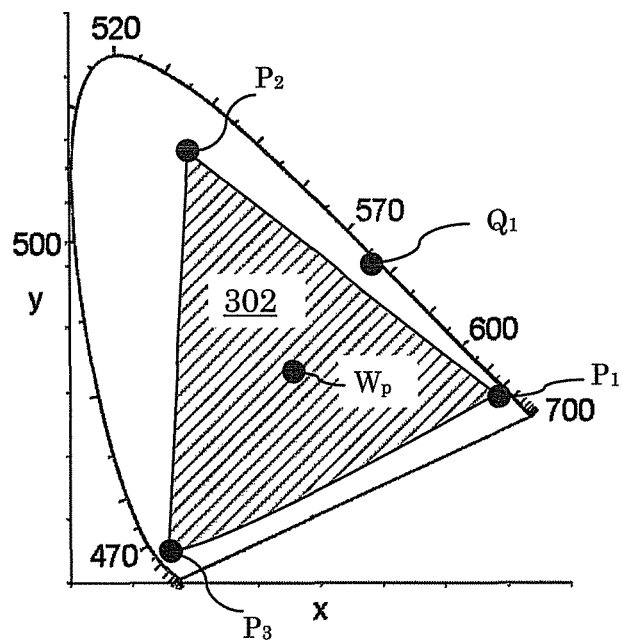
FIG. 3 depicts a representative color gamut of a true-depth anaglyph in which the second image of the anaglyph is rendered in a yellow or orange $Q_1$ primary color and the first image is rendered in red $P_1$, green $P_2$, and blue $P_3$ primary colors.

In another embodiment of the present invention, the primary color $Q_1$ may be yellow or orange. FIG. 1 depicts the transmission spectra of filters $F_1$ and $F_2$ in plot 116. The yellow or orange primary color $Q_1$ is represented by the third spectra 106. The primary color $P_1$ may be red and is represented by the fourth spectra 108. Primary color $P_2$ may be green and is represented by the second spectra 104. The primary color $P_3$ may be blue and is represented by the first spectra 102. FIG. 3 depicts the color gamut 302 of an anaglyph of the present embodiment in a CIE xy diagram. The color gamut of the anaglyphs may be represented by the triangle formed by the points $P_1$, $P_2$, and $P_3$ representing the primary colors of the first image of the anaglyph. The point $Q_1$ represents the primary color of the second image. The point $W_p$ represents the conventional white point.

Figure 4:
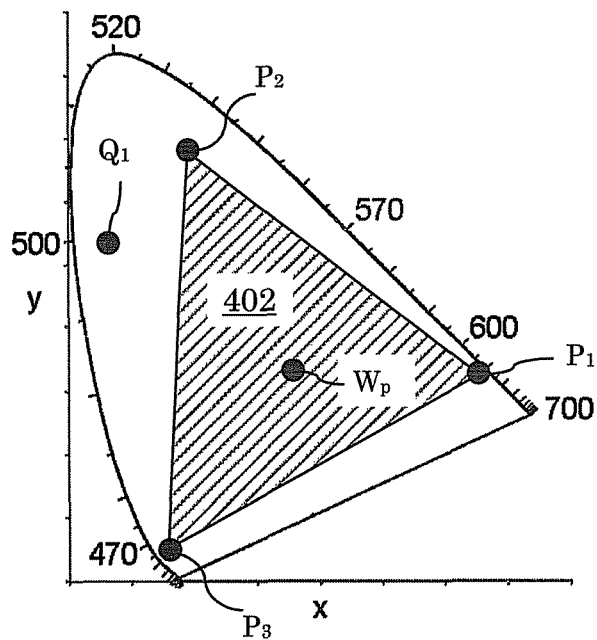
FIG. 4 depicts a representative color gamut of a true-depth anaglyph in which the second image of the anaglyph is rendered in a cyan $Q_1$ primary color and the first image is rendered in red $P_1$, green $P_2$, and blue $P_3$ primary colors.

In another embodiment of the present invention, the primary color $Q_1$ may be cyan. FIG. 1 depicts the transmission spectra of filters $F_1$ and $F_2$ in plot 114. The cyan primary color $Q_1$ is represented by the second spectra 104. The primary color $P_1$ may be red and is represented by the fourth spectra 108. Primary color $P_2$ may be green and is represented by the third spectra 106. Primary color $P_3$ may be blue and is represented by the first spectra 102. FIG. 4 depicts the color gamut 402 of an anaglyph of the present embodiment in a CIE xy diagram. The color gamut of the anaglyphs may be represented by the triangle formed by the points $P_1$, $P_2$, and $P_3$ representing the primary colors of the first image of the anaglyph. The point $Q_1$ represents the primary color of the second image. The point $W_p$ represents the conventional white point.

Figure 5:
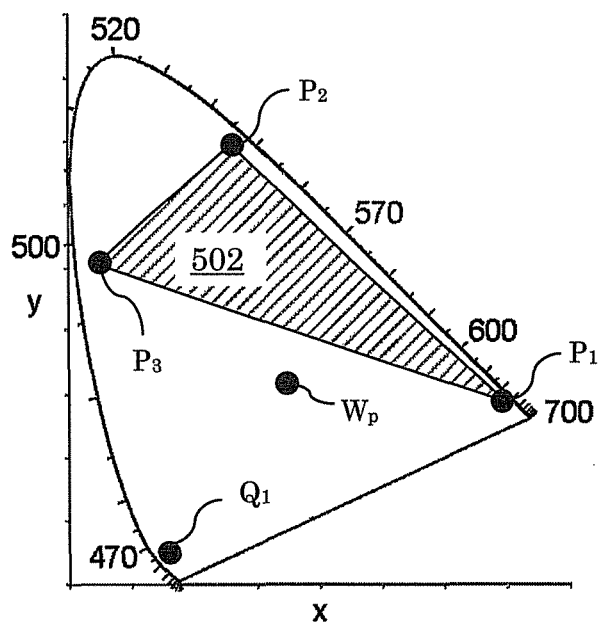
FIG. 5 depicts a representative color gamut of a true-depth anaglyph in which the second image of the anaglyph is rendered in a blue $Q_1$ primary color and the first image is rendered in yellow or red $P_1$, green $P_2$, and cyan $P_3$ primary colors.

In another embodiment of the present invention, the primary color $Q_1$ may be blue. FIG. 1 depicts the transmission spectra of filters $F_1$ and $F_2$ in plot 112. The blue primary color $Q_1$ is represented by the first spectra 102. The primary color $P_1$ may be red and is represented by the fourth spectra 108. Primary color $P_2$ may be green and is represented by the second spectra 106. Primary color $P_3$ may be cyan and is represented by the second spectra 104. FIG. 5 depicts the color gamut 502 of an anaglyph of the present embodiment in a CIE xy diagram. The color gamut of the anaglyphs may be represented by the triangle formed by the points $P_1$, $P_2$, and $P_3$ representing the primary colors of the first image of the anaglyph. The point $Q_1$ represents the primary color of the second image. The point $W_p$ represents the conventional white point.

When viewing an anaglyph through filters $F_1$ and $F_2$, the white point $W_p'$ generally moves close to the middle of the color gamut of the anaglyph. The shift in the white point may affect the saturation and hues of some colors. In the case of a three-color anaglyph, the white point $W_p'$ may shift toward the center of the gamut line segment. In this case, the hues near the midpoint point of the gamut may be de-saturated or loose color. In the case of a four-color anaglyph, the white point may move toward the center of the triangular gamut. This shift in the white point may allow a full spectrum of hues including red, yellow, green, cyan, blue, and magenta hues to be visible in the color gamut of the anaglyph.

Figure 6:
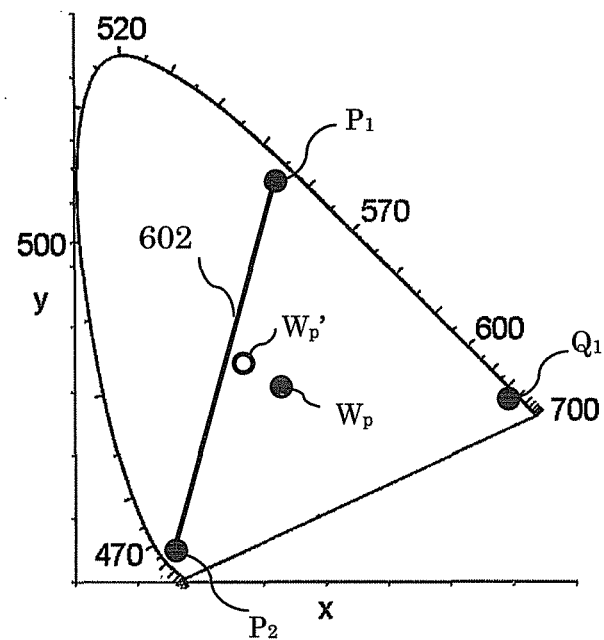
FIG. 6 depicts a representative color gamut of a true-depth anaglyph in which the second image of the anaglyph is rendered in a red $Q_1$ primary color and the first image is rendered in green $P_2$, and blue $P_3$ primary colors.

The color gamut of the first image of a three-color anaglyph may be a one-dimensional line segment. FIG. 6 depicts the color gamut 602 of a red/cyan anaglyph without retinal rivalry in a CIE xy diagram. The color gamut is the line segment connecting the points $P_1$ and $P_2$ representing the primary colors of the first image of the anaglyph. The point $Q_1$ represents the primary color of the second image. The point $W_p$ represents the conventional white point.

Figure 7:
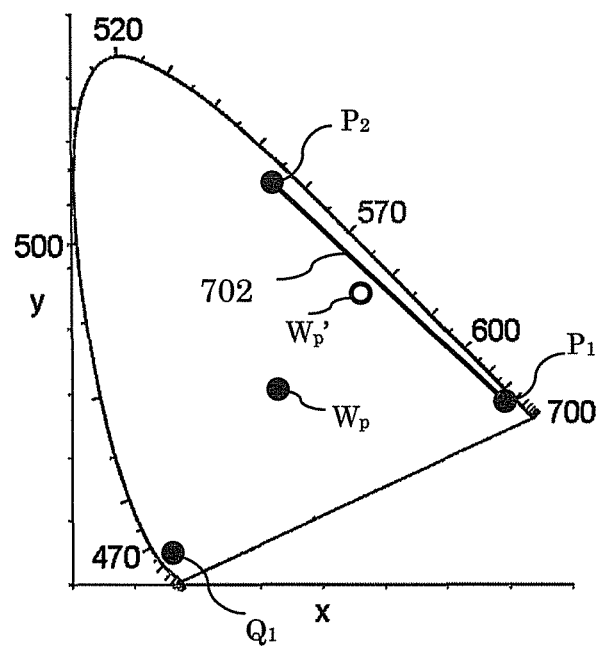
FIG. 7 depicts a representative color gamut of a true-depth anaglyph in which the second image of the anaglyph is rendered in a blue $Q_1$ primary color and the first image is rendered in red $P_1$, and green $P_2$ primary colors.

FIG. 7 depicts the color gamut 702 of a blue/yellow anaglyph without retinal rivalry in a CIE xy diagram. The color gamut is the line segment connecting the points $P_1$ and $P_2$ representing the primary colors of the first image of the anaglyph. The point $Q_1$ represents the primary color of the second image. The point $W_p$ represents the conventional white point.

For a three-color anaglyph, the white point generally moves close to the midpoint of color gamut line segment. FIGS. 6 and 7 show the approximate location of the white point $W_p'$ viewed through the first color filter. The shift in the white point generally allows about three hues to be visible in the color gamut. For example the color gamut of a red/cyan anaglyph may include yellow, partial green, and blue hues and possibly a cyan tint to the white point. The color gamut of a green/magenta anaglyph may include red and blue hues and possibly a magenta tint to the white point. The color gamut of a blue/yellow anaglyph may include red and green hues and possibly a yellow tint to the white point.

Since the color gamut of a four-color anaglyphs may be two-dimensional, four-color anaglyphs generally may have greater color gamuts than three-color anaglyphs.

Balanced-Brightness Anaglyphs

Retinal rivalry may be associated with unbalanced brightness contrast in the first and second images of a stereo pair. For example, a red object, which may appear relatively bright through a red filter and may appear relatively dark through a cyan filter, may cause retinal rivalry in a stereo view. Generally the human visual system may not easily fuse a dark object observed by one eye with a bright object observed by the other eye. Instead, the user essentially experiences double vision, where the left and right eyes "see" independently, and stereoscopic perception is much reduced or absent. (Stereoscopic perception requires the cooperation of both eyes.)

Similarly, stereoscopic perception may be reduced wherever retinal rivalry is observed in a stereo view. It is a discovery of the present invention that avoiding retinal rivalry in a stereo view is essentially identical to the condition required for full stereoscopic depth perception. Since the perception of stereoscopic depth depends on observing relationships between objects, retinal rivalry in a small portion of an image may dramatically reduce the perception of stereoscopic depth in other portions of the image as well.

Some embodiments of the present invention include methods for creating anaglyphs with little or no perceivable retinal rivalry. The present invention identifies the color property which is substantially used by the visual system to process stereoscopic information. Herein this stereoscopic color property is called brightness contrast or brightness. The brightness may be considered a carrier of the brightness contrast in the image. When the brightness contrast is balanced in both eyes for like subject matter, retinal rivalry may be essentially absent from the stereo view and full stereoscopic depth (true-depth) may be perceived in a stereo view. The methods of the present invention to create anaglyphs with balanced brightness may be applied to three-color anaglyphs as well as to four-color anaglyphs. Herein anaglyphs with balanced brightness contrast are sometimes said to have balanced brightness even though the absolute brightness may be different in the left and right views. Herein anaglyphs with balanced brightness are sometimes called true-depth anaglyphs or balanced-brightness anaglyphs.

In the prior art, the term brightness is generally used to describe an observed property of light rather than a physical property of light. In the present invention, brightness also describes an observed property of light. However, in the present invention, brightness is defined by the absence of retinal rivalry which may be determined by observation.

Anaglyphs often have about 3-10 times more luminance in the first image than in the second image. This is because the single primary color $Q_1$ of the second image does not provide as much luminance as the two or more primary colors of the first image. When the second image has a luminance of about 15-30% of the first image, the second image may appear to be about the same luminance as the first image due to vision adaptations. The lower luminance of the second image of about 15-30% allows the color gamut in an anaglyph to be similar to the color gamut of the first image.

When the brightness is balanced in an anaglyph, the color gamut of the stereo view may be nearly identical to the color gamut of the first image. For example, when the brightness is balanced, the color gamut of a red/cyan anaglyph may be nearly equal to the color gamut observed in the first image viewed through the cyan filter. Similarly, the color gamut observed in a four-color anaglyph may be nearly equal to the color gamut of the first image. Therefore FIGS. 2-7 and 15 show approximately the color gamuts of balanced-brightness, four-color and three-color anaglyphs. Three-color anaglyphs with balanced brightness generally may have one-dimensional color gamuts depicted schematically in FIGS. 6 and 7. Four-color anaglyphs with balanced brightness generally may have two-dimensional color gamuts depicted schematically in FIGS. 2-5.

The primary color $Q_1$ may sometimes cause white colors in an stereo view to be shifted toward the hue of the primary color $Q_1$. For this reason, it may be beneficial to perform corrective color processing of the first image to shift the white point of the first image away from the hue of the primary color $Q_1$.

Figure 8:
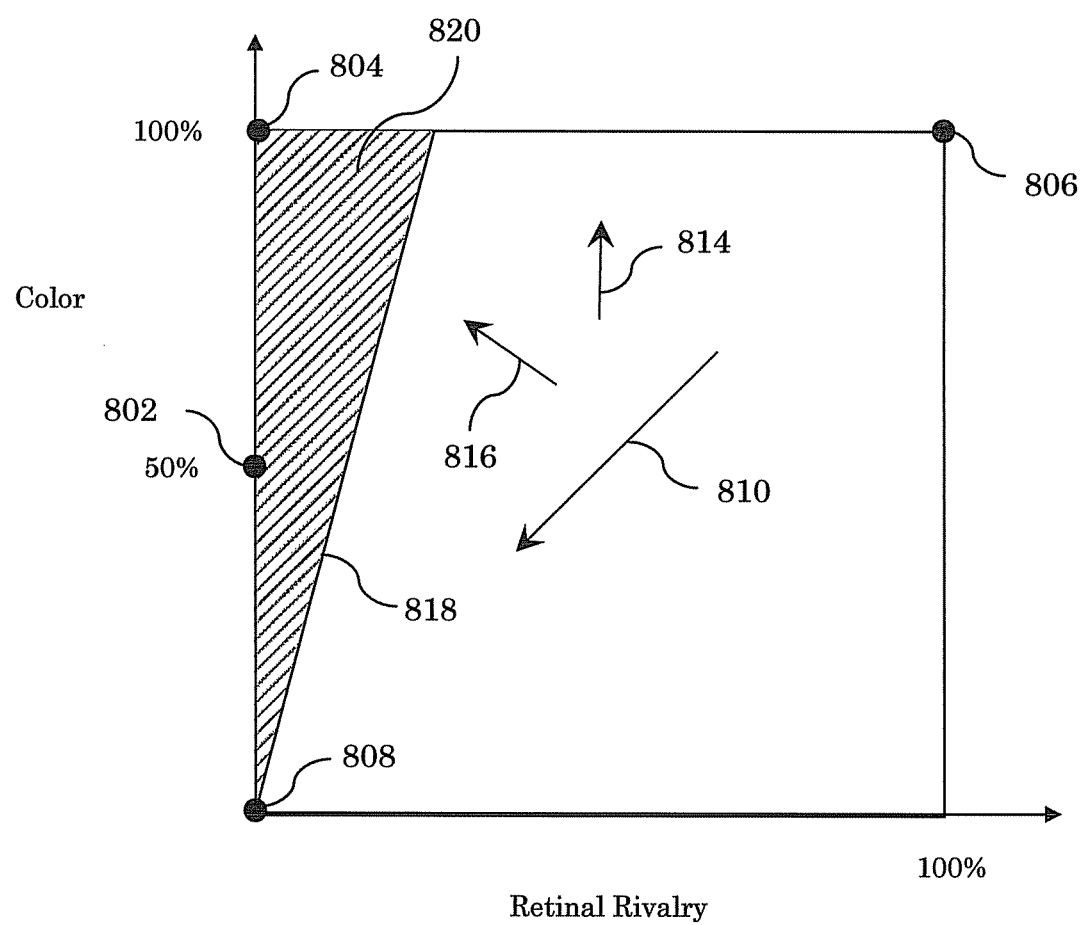
FIG. 8 depicts a color versus retinal rivalry phase diagram for anaglyphs.

Anaglyphs with substantial retinal rivalry generally may have a greater color gamut than if the retinal rivalry were absent, but then depth perception is reduced. FIG. 8 depicts the relationship of the anaglyphs with balanced brightness of the present invention to the three-color anaglyphs without balanced brightness of the prior art in a color versus retinal rivalry phase diagram. The vertical line segment at zero retinal rivalry represents some of the anaglyphs of the present invention. A balanced-brightness, three-color anaglyph of the present invention is drawn at the 50% color point 802 because about half of the hues of a color wheel may be observed in the three-color anaglyphs. For example in a red/cyan anaglyph with balanced brightness, three hues out of six may be perceived: (1) blue, (2) unsaturated green, and (3) near yellow. The missing hues may be (1) red, (2) magenta, and (3) cyan (although an unsaturated cyan may be perceivable). A balanced-brightness, four-color anaglyph of the present invention is drawn at the 100% color point 804 because a full spectrum of hues may be observed in four-color anaglyphs.

The horizontal line at zero color in FIG. 8 represents grayscale anaglyphs of the prior art. Grayscale images may produce nearly balanced-brightness anaglyphs without the need for determining the brightness color property of the present invention which the visual system uses to perceive stereoscopic depth. In order to balance the brightness of color anaglyphs, it is necessary to determine how the brightness contrast depends on a color's hue, saturation, and luminance (or luminance contrast). Grayscale images have a constant hue and saturation so the brightness only depends on the luminance (or luminance contrast). Since the luminance (or luminance contrast) may be nearly balanced in a grayscale image, the brightness contrast may be automatically nearly balanced also. Therefore in FIG. 8, the point 808 at zero color and zero retinal rivalry (0,0) represents most grayscale anaglyphs of the prior art.

In color anaglyphs of the prior art, as the color saturation increases from zero, the retinal rivalry becomes non-zero. In FIG. 8, curve 818 represents schematically the envelope of prior art anaglyphs which attempt a compromise between retinal rivalry and the color gamut. A true-color anaglyph of the prior art is drawn at the 100% color, 100% retinal rivalry point 806 (100,100) (although a true-color anaglyph might not strictly have 100% color). For example, a pure red or cyan hue in a true-color anaglyph has maximum retinal rivalry. True-color anaglyphs are often described as having full-color.

De-saturating a stereoscopic image will typically reduce the retinal rivalry in the stereo view of the anaglyph compared with a true-color anaglyph. A de-saturation process of the prior art is represented by arrow 810 in FIG. 8. Methods in the prior art which attempt to maximize the color gamut in the presence of substantial retinal rivalry, or seek a compromise between retinal rivalry and color gamut may be represented by arrows 814 and 816 in FIG. 8.

FIG. 8 depicts how the anaglyphs of the prior art generally lie in a continuum on a color-gamut/retinal-rivalry phase diagram whereas there is a gap between the balanced-brightness anaglyphs of the present invention and the anaglyphs of the prior art. The region 820 between curve 818 and the zero-retinal-rivalry line represents additional methods of the present invention in which the retinal rivalry in an anaglyph may be constrained below certain levels.

Methods

The color property used by the visual system to process stereoscopic depth was discovered by the present inventor through a series of approximation methods while attempting to further reduce retinal rivalry in red/cyan anaglyphs. The methods below are conceptually similar, but progressively better account for the non-linearity of a display device. Method 2 below is the first method described which partially takes into account the non-linearity of the display device. Each method provides control over the retinal rivalry in an anaglyph where the retinal rivalry may be constrained below a certain level by the method. Herein anaglyphs in which the retinal rivalry is constrained below a certain level are called balanced-brightness anaglyphs.

First, it was noticed that retinal rivalry occurs in anaglyphs where an edge in the subject matter is observed with more contrast in one eye than in the other eye. It seemed apparent that balancing the contrast in all subject matter would eliminate retinal rivalry. Secondly, it was noticed that stereoscopic fusion depends largely on the edges of objects being observed by both eyes. Here an edge may be generalized to any type of contrast in an image. In order for all edges to be detected by both eyes for all subject matter, it is apparently sufficient to observe balanced contrast at all brightness levels in the image. Herein the definition of balanced contrast in the first and second views is: the relative contrast in the two views which eliminates retinal rivalry in the stereo view. Then the goal may be to balance the contrast in all subject matter observed by the left and right eyes in a stereo view in order to eliminate retinal rivalry. Obtaining full-depth perception is an additional benefit of these methods which is apparently linked to the absence of retinal rivalry.

The brightness of a hue is generally an integral of the brightness contrast. Therefore, the present invention provides a definition of brightness which is different from that of the prior art. Herein the brightness is an observed property of light rather than a physical property of light. The relative brightness of different hues depends on subjective evaluation by users. The relative brightness may vary from user to user and may vary over time for the same user. The relative brightness may also depend on the size of a patch of color, the surrounding colors, and on the vision accommodation of the user. Therefore, implementing the methods below may sometimes require skill, patience, training and multiple observers.

Comparing the contrast in the first and second views of anaglyphs may be carried out by using one eye to view in rapid succession the first and second images through the first and second filters respectively. Using one eye reduces some of the problems of eye accommodation and eye variations. Furthermore, the test anaglyphs may be prepared from identical left and right images so that the stereoscopic parallax may be zero throughout the anaglyphs. This also eliminates the issue of variations of subject matter between the first and second images.

Some of the methods described below require the determination of certain experimental parameters. These parameters may be determined for test anaglyphs in which the first and second image are identical. When the first and second images are identical, the color coordinates are identical and there is no need to distinguish between the first and second images' color coordinates. In order to simplify the descriptions of the methods, the descriptions below sometimes may not distinguish between the color coordinates of first and second images. In general, the methods contain a set of color operations, which may include a projection, that may be applied to both images before the anaglyph is constructed. Then in order to create a balanced-brightness anaglyph, the brightness coordinate may be determined for the second image. Then the anaglyph may be constructed from the modified first image and the brightness coordinate determined from the modified second image. Some of the methods are illustrated below for red/cyan anaglyphs. Adapting these methods to other three-color anaglyphs such as blue/yellow and green/magenta anaglyphs and to four-color anaglyphs are within the scope of the present invention.

Balanced Brightness Method 1

In method 1 of the present invention to create balanced-brightness anaglyphs, the color hues which generally have balanced brightness when viewed through the red and cyan filters may be identified. This may involve comparing the relative brightness of different hues observed through different colored filters. Comparing the brightness of different hues may be complicated by the properties of vision. The relative brightness of different hues such as green and red hues relies on subjective judgements. These judgements may depend on the user, the surrounding colors, the ambient light, the size of a color patch, the hue and luminance accommodation of the eye, and may vary for a user over time. Nevertheless, for a red/cyan anaglyph, it was determined for a particular computer monitor that two hues, a certain greenish-yellow hue and a certain bluish-purple hue, generally balance the brightness observed through a particular pair of red and cyan filters. Therefore, when the colors in a stereoscopic image are projected into these two hues, the observed retinal rivalry may be constrained below a certain level over the entire stereo view.

In terms of the RGB coordinates, the two hues may be summarized as follows:

$$R=\alpha_1 G \text{ greenish-yellow,}$$

$$R=\alpha_2 B \text{ bluish-magenta}$$

where $\alpha_1<1$, $\alpha_2<1$ may be measurable parameters which determine the hues. To simplify the discussion, but without loss of generality $\alpha_1+\alpha_2=1$ may be assumed.

By subtracting off the gray component W of an image, the $\alpha_1$ and $\alpha_2$ may be optimized with more flexibility or accuracy for a particular image. Also a color projection step, discussed below, may be performed with more flexibility with the gray component subtracted off. First, three color hues red r, green g, and blue b may be defined as follows:

$$r=R-W,$$

$$g=G-W,$$

$$b=B-W,$$

$$W=\min(R,G,B)$$

Then, the balanced brightness condition may be written as follows:

$$r'=\alpha_1 g+\alpha_2 b,$$

$$R_A=W+r',$$

$$G_A=W+g,$$

$$B_A=W+b$$

where $R_A$, $G_A$ and $B_A$ are the primary coordinate values of the anaglyph. r' represents the new coordinate values that replace the original r coordinate values in the initial image. The brightness condition above includes the case of a grayscale image $(R_A,G_A,G_A)=(W,W,W)$ having balanced brightness.

In general, different display media may have different values of $\alpha_1$ and $\alpha_2$ which may or may not correspond to different observed hues. For one particular CRT computer monitor, $\alpha_1$ was about 0.9 and $\alpha_2$ was about 0.4. For one particular inkjet printer, $\alpha_1$ was about 0.7 and $\alpha_2$ was about 0.1. $\alpha_1$ and $\alpha_2$ may be expected to vary greatly for display media which do not conform to certain color standards.

In creating, a red/cyan anaglyph with balanced brightness, the red color coordinate R is replaced with a brightness coordinate. In order to preserve the information in the original R color coordinate, it may be beneficial to first project the original RGB coordinates into new G' and B' coordinates.

This may be implemented by first projecting the (r,g,b,W) color coordinates into new (g,b,W)' coordinates, then calculating the new (r)' color coordinate from the (g, b,W)' coordinates, and finally creating the anaglyph $(R,G,B)_A$:

Red/Cyan Anaglyph

Step 1: $(R,G,B)_i \rightarrow (r,g,b,W)_i,$

Step 2: $(r,g,b,W)_i \rightarrow (g,b,W)_i',$

Step 3: $(g,b,W)_2' \rightarrow (r)_2'$ where $r=\alpha_1 g+\alpha_2 b,$

Step 4: $(r,g,b,W)_i' \rightarrow (R,G,B)_i'$

Step 5: $(R)_2', (G,B)_1' \rightarrow (R,G,B)_A$ where i may be the first or second image.

Step 2 may be implemented by a method which projects the information in the r coordinate into the (g',b',W') coordinates such as:

$$g' = \beta_1 g + \beta_2 r,$$

$$b' = \beta_3 b + \beta_4 r, \text{ and}$$

$$W' = \beta_5 W + \beta_6 r.$$

where the $\beta_i$ may be selectable parameters. Many other projection methods are possible and are within the scope of the present invention. Herein, the $\beta_i$ parameters are called projection data. The projection data may be selected by a user according to a user's preferences. Projection data may be selected which substantially transforms the relative brightness of hues in the initial image into the projected image.

Step 5 shows how to construct the anaglyph from RGB coordinates of the first and second images. Steps 1-4 may be applied to the primary colors of the second image to obtain $(R)_2'$. Steps 1-2 and 4 may be applied to the primary colors of the first image to obtain $(G,B)_1'$. Then step 5 combines the RGB coordinates into an anaglyph $(R,G,B)_A$.

This first method may be written as a transformation of the first image as follows:

$$(R,G,B)_1 \longrightarrow (r,g,b,W)_1 \xrightarrow{G_P} (g,b,W)_1' \longrightarrow (G,B)_A$$

and the transformation of the second image as follows:

$$(R,G,B)_2 \longrightarrow (r,g,b,W)_2 \xrightarrow{G_P} (g,b,W)_2' \xrightarrow{G_B} (r,W)_2' \longrightarrow (R)_A$$

where $G_P$ is a projection transformation and $G_B$ is a balanced-brightness transformation.

In this method, due to the non-linearities of a display media, the optimal values of $\alpha_1$ and $\alpha_2$ for an image may depend on the distribution of colors in the image. However even non-optimal $\alpha_1$ and $\alpha_2$ may sometimes be used to reduce retinal rivalry to low levels. As the non-linearities of a display media are better accounted for in methods below, the optimal values of $\alpha_1$ and $\alpha_2$ for a particular method may depend less on the distribution of colors in the image and the retinal rivalry in the image may approach zero.

Balanced Brightness Method 2

In method 2 of the present invention to create balanced-brightness anaglyphs, the non-linearities in the display device may be taken into account to some extent. First, six color hues red r, yellow y, green g, cyan c, blue b, and magenta m may be defined as follows:

$$y = \min(R,G) - W,$$

$$c = \min(G,B) - W,$$

$$m = \min(B,R) - W,$$

$$r = R - y - m - W,$$

$$g = G - y - c - W,$$

$$b = B - c - m - W,$$

$$W = \min(R,G,B).$$

The R, G and B coordinates may be obtained from these coordinates as follows:

$$R = W + y + m + r,$$

$$G = W + y + c + g,$$

$$B = W + c + m + b.$$

The balanced-brightness condition may be summarized as follows:

$$y' = \alpha_1 g \text{ greenish-yellow,}$$

$$m' = \alpha_2 b \text{ bluish-magenta,}$$

$$R_A = W + c + y' + m',$$

$$G_A = W + c + g + y',$$

$$B_A = W + m' + b + c$$

where $\alpha_1$ and $\alpha_2$ may be measurable parameters which determine two hues and where $R_A$, $G_A$, $B_A$ are the primary coordinates of the anaglyph image. By adding the c hue to the $R_A$ coordinate, the cyan hue $c_A$ may be absent in the anaglyph image $c_A = 0$. Also by not adding the r hue to the $R_A$ coordinate, the red hue $r_A$ may be absent in the anaglyph image, $r_A = 0$.

As in method 1 above, different display media may have different optimal values of $\alpha_1$ and $\alpha_2$ which may or may not correspond to different observed hues. For one particular CRT computer monitor $\alpha_1$ was about 9 and $\alpha_2$ was about 2. For one particular inkjet printer $\alpha_1$ was about 9 and $\alpha_2$ was about 0.3. $\alpha_1$ and $\alpha_2$ may be expected to vary greatly for display media which do not conform to certain color standards.

This second method may be implemented by first projecting the (r,y,g,c,b,m,W) color coordinates into new (g,c,b,W)' coordinates, then calculating the new (y,m)' color coordinates from the (g,c,b,W)' coordinates, and finally creating the anaglyph $(R,G,B)_A$ primary coordinates:

Red/Cyan Anaglyph

Step 1: $(R,G,B)_i \rightarrow (r,y,g,c,b,m,W)_i,$

Step 2: $(r,y,g,c,b,m,W)_i \rightarrow (g,c,b,W)_i',$

Step 3: $(g,c,b,W)_i' \rightarrow (y,m)_i'$ where $y = \alpha_1 g$, $m = \alpha_2 b$, Step 4: $(y,g,c,b,m,W)_i' \rightarrow (R,G,B)_i'$ where $R = W + c + y + m,$ Step 5: $(R)_2', (G,B)_1' \rightarrow (R,G,B)_A$ where i may be the first or second image.

Step 2 may be implemented by a method which projects the information in the initial r, y, and m coordinates into the (g',b',W') coordinates such as:

$$b' = \beta_0 b + \beta_1 r + \beta_2 m,$$

$$c' = \beta_3 c,$$

$$g' = \beta_4 g + \beta_5 y + \beta_6 r, \text{ and}$$

$$W' = \beta_7 W + \beta_8 r + \beta_9 y + \beta_{10} c + \beta_{11} m.$$

where the $\beta_i$ may be selectable parameters. Many other projection methods are possible and are within the scope of the present invention. Herein, the $\beta_i$ parameters are called projection data. The projection data may be selected by a user according to a user's preference. Projection data may be selected which substantially transforms the relative brightness of hues in the initial image into the projected image.

This second method may be written as a transform of the first image as follows:

$$(R, G, B)_1 \longrightarrow (r, y, g, c, b, W)_1 \xrightarrow{G_P} (g, c, b, W)_1' \longrightarrow$$
$$(y, g, c, b, m, W)_1' \longrightarrow (G, B)_A$$

and the transformation of the second image as follows:

$$(R, G, B)_2 \longrightarrow (r, y, g, c, b, m, W)_2 \xrightarrow{G_P} (g, c, b, W)_2' \xrightarrow{G_B}$$
$$(y', c, m, W)_2' \xrightarrow{G_B} (R)_A$$

where $G_P$ is a projection transformation and $G_B$ is a balanced-brightness transformation.

This second method takes into account the non-linearities of a display to some degree by allowing the six hues to be independently projected into the $(g,c,bW)_1'$ coordinates.

This second method may also be applied to blue/yellow anaglyphs. For blue/yellow anaglyphs the balanced-brightness condition may be summarized as follows:

$c' = \alpha_1 g$ greenish-cyan, $m' = \alpha_2 r$ bluish-magenta, $R_A = W + r + y + m'$, $G_A = W + c' + g + y$, $B_A = W + m' + y + c'$, where $\alpha_1$ and $\alpha_2$ may be measurable parameters and where $R_A$, $G_A$, $B_A$ are the primary coordinates of the anaglyph image. By adding the y' hue to the $B_A$ coordinate, the yellow hue $y_A$ may be absent in the anaglyph image, $y_A = 0$. Also by not adding the b hue to the $B_A$ coordinate, the blue hue $b_A$ may be absent in the anaglyph image, $b_A = 0$.

This second method to create balanced brightness anaglyphs may also be applied to green/magenta anaglyphs. For a green/magenta anaglyph the balanced-brightness condition may be summarized as follows:

$c' = \alpha_1 b$ greenish-cyan, $m' = \alpha_2 r$ bluish-magenta, $R_A = W + r + y + m'$, $G_A = W + c' + m' + y$, $B_A = W + m + b + c'$, where $\alpha_1$ and $\alpha_2$ may be measurable parameters and where $R_A$, $G_A$, $B_A$ are the primary coordinates of the anaglyph image. By adding the m' hue to the $G_A$ coordinate, the magenta hue $m_A$ may be absent in the anaglyph image, $m_A = 0$. Also by not adding the g hue to the $G_A$ coordinate, the green hue $g_A$ may be absent in the anaglyph image, $g_A = 0$.

This second method may result in much less retinal rivalry than generally observed in color anaglyphs of the prior art. However, some retinal rivalry may still be present due to non-linearities of the display media. The non-linearities may be further taken into account by generalizing the second method. For a red/cyan anaglyph the two balanced hues relationships may be generalized as follows:

$y' = H_y(g)$ greenish-yellow, and $m' = H_m(b)$ bluish-magenta, where $H_y$ and $H_m$ may be non-linear functions.

Balanced Brightness Method 3

In method 3 of the present invention to create balanced-brightness anaglyphs, it may be supposed that there is a linear color space $R^L G^L B^L$ in which the contributions of each primary color to the brightness of the first and second images in an anaglyph may be added together. First $R^L G^L B^L$ may be defined as follows:

$R^L = H_R(R)$, $G^L = H_G(G)$, $B^L = H_B(B)$, where $H_R$, $H_G$, and $H_B$ may be non-linearity profiles which transform the color coordinates into linear color coordinates, and which depend on the properties of the display device.

Then the linear brightness $Y^L_B$ of the first and second images may be written as $Y^L_{B1} = \alpha_G G^L + \alpha_B B^L$, $Y^L_{B2} = \alpha_R R^L$, or $Y^L_{B1} = \alpha_G H_G(G) + \alpha_B H_B(B)$, $Y^L_{B2} = \alpha_R H_R(R)$, where $Y^L_{B1}$ and $Y^L_{B2}$ represent the linear brightness of the first and second image respectively; and where $\alpha_G$, $\alpha_G$, and $\alpha_G$, may be measurable parameters. The balanced brightness condition may be approximated by the relationship $Y^L_{B1} \sim Y^L_{B2}$. Then R may be written as a function of G and B as follows:

$R = H_2^{-1}(\alpha_1 H_G(G) + \alpha_2 H_B(B))$, where $H_2$ is a function and where $\alpha_1 < 1$ and $\alpha_2 < 1$ may be measurable constants.

This third method may be implemented by first projecting the (R,G,B) primary coordinates into new (G,B)' primary coordinates, then calculating the new (R)' primary coordinate from the (G,B)' coordinates, and finally creating the anaglyph $(R,G,B)_A$ primary coordinates:

Red/Cyan Anaglyph

Step 1: $(R,G,B)_i \rightarrow (G,B)_i'$,

Step 2: $(G,B)_2' \rightarrow (R)_2'$ where $R = H_2^{-1}(\alpha_1 H_G(G) + \alpha_2 H_B(B))$, Step 3: $(R)_2', (G,B)_1' \rightarrow (R,G,B)_A$ where i may be the first or second image.

Step 1 may be implemented by a method which projects some of the information in the (R) coordinate into the (G,B) coordinates. Methods 1 and 2 gave examples of projections which attempt to preserve some of the information in the R coordinate in the anaglyph. Either the projections of methods 1 or 2 may be used with projection data or another projection method may be used with projection data. All projection methods are intended to be within the scope of the present invention. Projection data may be selected which substantially transforms the relative brightness of hues in the initial image into the projected image.

This third method may be generally very successful in creating three-color anaglyph images with low levels of retinal rivalry. Functions $H_i$ may often be approximated by "gamma" functions as follows:

$$H_i(P_i)=P_i^{\gamma i}$$

where $P_i$ may be R,G, and B primary colors and the $\gamma_i$ may be measurable parameters and are often between about 2.0 and 3.0. Generally the optimal values of $\alpha_1$ and $\alpha_2$ may create little observable retinal rivalry for all images with any distribution of colors.

This third method may be written as a transform of the first image as follows:

$$(R, G, B)_1 \xrightarrow{G_P} (G, B)_1' \longrightarrow (G, B)_A$$

and the transformation of the second image as follows:

$$(R, G, B)_2 \xrightarrow{G_P} (G, B)_2' \xrightarrow{G_B} (R)_A$$

where $G_P$ is a projection transformation and $G_B$ is a balanced-brightness transformation.

The three steps above are a third method of creating balanced-brightness, red/cyan anaglyphs. The first step projects the image coordinates into two primary color coordinates. The second step balances the brightness of the first and second images. The third step creates the anaglyph from the two images of the stereo pair. Similar methods of the present invention for creating balanced-brightness, yellow/blue and green/magenta anaglyphs are as follows:

Yellow/Blue Anaglyph

Step 1: $(R,G,B)_i \rightarrow (R,G)_i'$,

Step 2: $(R,G)_2' \rightarrow (B)_2'$ where $B=H_2^{-1}(\alpha_1 H_R(R)+\alpha_2 H_G(G))$, Step 3: $(B)_2', (R,G)_1' \rightarrow (R,G,B)_A$ and Green/Magenta Anaglyph Step 1: $(R,G,B)_i \rightarrow (R,B)_i'$, Step 2: $(R,B)_2' \rightarrow (G)_2'$ where $G=H_2^{-1}(\alpha_1 H_R(R)+\alpha_2 H_B(B))$, Step 3: $(G)_2', (R_1,B_1)_1' \rightarrow (R,G,B)_A$.

Balanced Brightness Method 4

In method 4 of the present invention to create balanced-brightness anaglyphs, the method 3 above for creating three-color anaglyphs in $\{R,G,B\}$ primary colors is generalized to creating anaglyphs in $\{P_1,P_2,Q_1\}_A$ primary colors. A general method for a three-color anaglyph may be written as follows:

Three-Color Anaglyph

Step 1: $(P_1,P_2,P_3)_i \rightarrow (P_1,P_2)_i'$,

Step 2: $(P_1,P_2)_2' + (Q_1)_2'$ where $Q_1=H_2^{-1}(\alpha_1 H_{P1}(P_1)+\alpha_2 H_{P2}(P_2))$, Step 3: $(Q_1)_2', (P_1,P_2)_1' \rightarrow (P_1,P_2,Q_1)_A$.

where i is the first or second image and the balance brightness condition is:

$$Q_1=H_2^{-1}(\alpha_1 H_{P1}(P_1)+\alpha_2 H_{P2}(P_2))$$

where $H_{P1}$, $H_{P2}$, and $H_2$ may be non-linearity profiles which transform the color coordinates into linear color coordinates, and which depend on the properties of the display device.

The balanced brightness condition above may be a sufficient description of three-color anaglyphs with balanced brightness if it is understood that $Q_1$ is a primary color of the second image and $\{P_1, \ldots, P_m\}$ are primary colors the first image, and the condition applies to like subject matter in the first and second images.

This fourth method may be generally very successful in creating three-color anaglyph images with low levels of retinal rivalry. Functions $H_i$ may often be approximated by "gamma" functions as follows:

$$H_i(P_i)=P_i^{\gamma i}$$

where the $\gamma_i$ may be measurable parameters and are often between about 2.0 and 3.0. Generally the optimal values of $\alpha_1$ and $\alpha_2$ may result in little observable retinal rivalry for all images with any distribution of colors.

This fourth method of creating balanced-brightness three-color anaglyphs may be written as follows:

This fourth method may be written as a transform of the first image as follows:

$$(P_1, P_2, P_3)_1 \xrightarrow{G_P} (P_2, P_3)_1' \longrightarrow (P_2, P_3)_A,$$

and the transformation of the second image as follows:

$$(P_1, P_2, P_3)_2 \xrightarrow{G_P} (P_2, P_3)_2' \xrightarrow{G_B} (Q_1)_A,$$

where $G_P$ is a projection transformation, $G_B$ is a balanced-brightness transformation, and $(P_1,P_2,Q_1)_A$ are three primary color coordinates of the anaglyph. Methods 1-3 are special cases of this fourth method with different $G_P$ and $G_B$ transformations. The projection transformation may include projection data which may be selected by a user. Projection data may be selected which substantially transforms the relative brightness of hues in the initial image into the projected image.

Balanced Brightness Method 5

The optimal values of parameters $\alpha_1$ and $\alpha_2$ in methods 1-4 of the present invention may depend on the areal size of a particular hue in an image. For example a small patch of cyan surrounded by black may appear less bright than a large patch of cyan surrounded by black. Therefore, methods of adding the effects of patch size may be used to produced anaglyphs with even more accurately balanced brightness.

In method 5 of the present invention to create balanced-brightness anaglyphs, a mask image may be used to account for the variations of brightness with respect to the size of a patch of color. For simplicity of discussion, it may be assumed that the "true" brightness of a color is its brightness observed in a large patch of the color filling a substantial portion of a user's field of view. As the size of a patch of color is reduced, the apparent brightness may be reduced (or masked) by neighboring patches of color which may include a black color.

Each primary color may be masked by the presence of other primary colors nearby in the image. A masked primary color may be defined for each primary color. The R,G, and B color coordinates may be transformed into the masked color coordinates $R_M$, $G_M$, and $B_M$ by a masking transformation $G_M$. For example:

$$R_M = M_R(R),$$

$$G_M = M_G(G), \text{ and}$$

$$B_M = M_B(B)$$

where $M_R$, $M_G$, and $M_B$ may be masking functions. For simplicity, the masking functions may be approximated as factors as follows:

$$R_M = M_R R,$$

$$G_M = M_G G, \text{ and}$$

$$B_M = M_B B$$

where $M_R$, $M_G$, and $M_B$ are factors. The $R_M$, $G_M$, and $B_M$ coordinates may be used in a balanced brightness condition. For example, the balanced brightness condition of method 3 described above gives:

$$R_M = H_2^{-1}(\alpha_1 H_G(G_M) + \alpha_2 H_B(B_M)),$$

or $$R = H_2^{-1}(\alpha_1 H_G(M_G G) + \alpha_2 H_B(M_B B))/M_R,$$

where R, G and B may be coordinates of the same image.

The $M_R$, $M_G$, and $M_B$ factors may be calculated for each point i in an image by assuming a certain masking interaction $T_{AB}$ between the primary colors where different primary colors reduce each other's brightness and same primary color enhances its own brightness. For example, for the G an B primary colors in a red/cyan anaglyph, $$M_{Gi} = \Sigma T_{GGij} Gj - \Sigma (T_{GBji} Bj), \text{ and}$$

$$M_{Bi} = \Sigma T_{BBij} Bj - \Sigma (T_{BGji} Gj)$$

while for the R primary color, $$M_{Ri} = \Sigma T_{RRij} Rj$$

where the $M_{Ri}$, $M_{Gi}$, and $M_{Bi}$ are the masking factors at each point i; the $T_{ABij}$ represent the interaction of the A primary color at point j in the image on the B primary color at point i in the image; and the sum is over all points j in the image. The factors $T_{ABij}$ may be determined to decrease with increasing distance between points i and j in the image making the interaction a local interaction.

The factors $M_{Ri}$, $M_{Gi}$, and $M_{Bi}$ may form a brightness mask image M with three channels ($M_R$, $M_G$, $M_B$). The mask image M only needs to be determined for the second image in order to implement the equal brightness condition. The image M may have less sharp edges than the second image and may be determined at lower resolution than the second image.

In some implementations of the present method, the mask image of the $Q_1$ primary color may be approximated as a constant due to the absence of other primary colors in the second image. For example, in red/cyan anaglyphs, $M_R = 1$ may be assumed.

The method of calculating a mask image described above is illustrative in nature. Any method of calculating an mask image which is descriptive of the dependence of the brightness of a color on the size of the color patch is within the scope of the present invention.

This fifth method may be written as a transform of the first image as follows:

$$(P_1, P_2, P_3)_1 \xrightarrow{G_P} (P_2, P_3)_1' \longrightarrow (P_2, P_3)_A,$$

and the transformation of the second image as follows:

$$(P_1, P_2, P_3)_2 \xrightarrow{G_P} (P_2, P_3)_2' \xrightarrow{G_M} (P_{2M}, P_{3M})_2' \xrightarrow{G_B} (Q_{1M})_2' \xrightarrow{G_M^{-1}} (Q_1)_A,$$

where $G_P$ is a projection transformation, $G_B$ is a balanced-brightness transformation, $G_M$ is a masking transformation, and $(P_1, P_2, Q_1)_A$ are three primary color coordinates of the anaglyph. Herein the mask image $\{M_1, M_2, M_Q\}$ is called masking data M. In general, the masking data M may contain parameter values for masking functions $M_1$, $M_2$, and $M_Q$ where the masking transformation $G_M$ comprises the masking functions $M_g$ and $M_Q$. Herein $G_M$ may be conceptually considered as a part of the $G_P$ transformation and $G_M^{-1}$ may be considered as part of the $G_B$ transformation. Herein $G_M$ may be conceptually considered as a part of the $G_P$ transformation and $G_M^{-1}$ may be considered as part of the $G_B$ transformation.

The present method of using a brightness mask image has been described for red/cyan anaglyphs. Similar methods of defining and using brightness mask images may be used for blue/yellow and green/magenta anaglyphs. These additional methods are within the scope of the present invention Balanced Brightness Method 6

In a method 6 of the present invention to create balanced-brightness anaglyphs, the method 4 above is generalized to four-color anaglyphs.

If the first image is displayed in m primary colors $\{P_1, \ldots, P_m\}$ and the second image is displayed in a $Q_1$ primary color, the brightness of the first and second images, $Y_{B1}$ and $Y_{B2}$ respectively, may be approximated as follows:

$$Y_{B1} = \Sigma_m \alpha_i H_i(P_i), \text{ and}$$

$$Y_{B2} = H_{Q1}(Q_1)$$

where $H_i$ and $H_{Q1}$ may be non-linearity profiles which transform the color coordinates into linear color coordinates; the $\alpha_i$ may be measurable parameters; and the sum is over the m primary colors. If the balanced-brightness condition is given by $Y_{B1} \sim Y_{B2}$, then the balanced brightness condition may be written as:

$$Q_1 = H_Q^{-1}(\Sigma_m \alpha_i H_i(P_i))$$

where $H_Q$ and the $H_i$ depend on the properties of the display. $H_Q$ and the $H_i$ may often be approximated by "gamma" functions as follows:

$$Q_1 = (\Sigma_m \alpha_i P_i^{\gamma i})^{1/\gamma}$$

where the $\gamma_i$ and $\gamma$ may be measurable parameters and are often between about 2.0 and 3.0.

Four-color anaglyphs with balanced brightness may be created using the following steps:

Four-Color Anaglyph

Step 1: $(P_1, \ldots, P_m)_2 \rightarrow (Q_1)_2$, where $Q_1 = H_Q^{-1}(\Sigma m \alpha_i H_i(P_i))$, Step 2: $(P_1, \ldots, P_m)_1 (Q_1)_2 \rightarrow (P_1, \ldots, P_m, Q_1)_A,$ where generally the $\alpha_i$ may be measurable parameters. In step 1, the second image coordinates may be used to calculate $Q_1$. In step 2, the $\{P_1, \ldots, P_m\}$ coordinates of the first image may be combined with the $Q_1$ coordinate of the second image to create an anaglyph.

The method of creating four-color anaglyphs with balanced brightness is shown above with fewer steps than the method 4 for three-color anaglyphs because the initial images generally do not need to be projected into an intermediate image with fewer primary colors. However a projection transformation may be used to make color modifications to the initial images. A more general method may be described as follows:

Four-Color Anaglyph

Step 1: $(P_1, \ldots, P_m)_i \rightarrow (P_1, \ldots, P_m)_i'$,

Step 2: $(P_1, \ldots, P_m)_2' \rightarrow (Q_1)_2'$ where $Q_1 = H_Q^{-1}(\Sigma_m \alpha_i H_i(P_i))$, Step 3: $(P_1, \ldots, P_m)_1'(Q_1)_2' \rightarrow (P_1, \ldots, P_m, Q_1)_A$.

The balanced brightness condition $Q_1 = H_Q^{-1}(\Sigma_m \alpha_i H_i(P_i))$ may be a sufficient description of four-color anaglyphs with balanced brightness if it is understood that $Q_1$ is a primary color of the second image and $\{P_1, \ldots, P_m\}$ are primary colors the first image, and the condition applies to like subject matter in the first and second images.

This sixth method of creating balanced-brightness four-color anaglyphs may be written as follows:

$(P_1, \ldots, P_m)_1 \xrightarrow{G_P} (P_1, \ldots, P_m)_1' \longrightarrow (P_1, \ldots, P_m)_A$ First Image:

$(P_1, \ldots, P_m)_2 \xrightarrow{G_P} (P_1, \ldots, P_m)_2' \xrightarrow{G_B} (Q_1)_A$, Second Image:
where $G_P$ is a projection transformation, and $G_B$ is a balanced-brightness transformation, and $(P_1, \ldots, P_m, Q_1)_A$ are four or more primary color coordinates of the anaglyph. The projection transformation may include projection data which may be selected by a user. Projection data may be selected which substantially transforms the relative brightness of hues in the initial image into the projected image.

Balanced Brightness Method 7

The optimal values of parameters $\alpha_1$ and $\alpha_2$ in method 6 of the present invention may depend on the areal size of a particular hue in an image. Therefore the patch size may be taken into account using a brightness mask image as in method 5 described above.

In method 7 of the present invention to create balanced-brightness, four-color anaglyphs, a mask image may be used to account for the variations of brightness with respect to the size of a patch of color.

If the first image is displayed in m primary colors $\{P_1, \ldots, P_m\}$ and the second image is displayed in a $Q_1$ primary color, masked primary colors may be defined for each primary color $P_g$ and $Q_1$ as follows:

$P_{gM} = M_g(P_g)$, and $Q_1 M = M_Q(Q_1)$, where $M_k$ and $M_Q$ may be masking functions. For simplicity, the masking functions may be approximated as factors as follows:

$P_{gM} = M_g P_g$, and $Q_{1M} = M_Q Q_1$, where $M_g$ and $M_Q$ may be factors. The $P_{gM}$ and $Q_{1M}$ coordinates may be used in an equal brightness condition. For example, the balanced brightness condition of method 6 described above gives:

$Q_1 M = H_Q^{-1}(\Sigma_m \alpha_g H_g(P_{gM}))$, or $Q_1 = H_Q^{-1}(\Sigma_m \alpha_g H_g(M_g P_g))/M_Q$.

where $Q_1$ and the $P_g$ may be coordinates of the same image and the sum is over the m primary colors.

The $M_g$ and $M_Q$ factors may be calculated for each point in an image by assuming a certain masking interaction $T_{AB}$ between the primary colors. For example, for the $\{P_1, \ldots, P_m\}$ primary colors $M_{gi} = \Sigma_j T_{ggij} P_{gj} - \Sigma_j \Sigma_h T_{ghij} P_{hj}$, where the $M_{gi}$ may be the masking factors at each point i; the $T_{ghij}$ represent the interaction of the $P_h$ primary color at point j in the image on the $P_g$ primary color at point i in the image; and the sum is over all points j in the image and primary colors $P_h$ where h is not equal to g. The factors $T_{ghij}$ may be determined to decrease with increasing distance between points i and j in the image malting the interaction a local interaction. The factors $M_{gi}$ may form a brightness mask image M with channels $\{M_1, \ldots, M_m, M_Q\}$ or mask images $\{M_1, \ldots, M_m\}$ and $\{M_Q\}$. The mask image M only needs to be determined for the second image in order to implement the equal brightness condition. The image M will generally may have less sharp edges than the second image and may be determined at lower resolution than the second image.

The mask image of the $Q_1$ primary color may be approximated as follows:

$M_{Qi} = \Sigma_j T_{QQij} Q_{1j}$ where $T_{QQij}$ is the interaction between brightness of the $Q_1$ primary color at point j with the brightness of the $Q_1$ primary color at point i. The mask image of the $Q_1$ primary color may be approximated as a constant due to the absence of other primary colors in the second image. In other words, $M_Q = 1$ may be assumed. Then $Q_1 = H_Q^{-1}(\Sigma \alpha_g H_g(M_g P_g))$.

The method of calculating a mask image described above is illustrative in nature. Any method of calculating a mask image which is descriptive of the dependence of the brightness of a color on the size of the color patch and may be determined for the second image rendered in $\{P_1, \ldots P_m\}$ coordinates or in $\{Q_1\}$ coordinates is within the scope of the present invention.

This seventh method may be written as a transform of the first image as follows:

$(P_1, \ldots, P_m)_1 \xrightarrow{G_P} (P_1, \ldots, P_m)_1' \longrightarrow (P_1, \ldots, P_m)_A$ and the transformation of the second image as follows:

$$(P_1, ..., P_m)_2 \xrightarrow{G_P} (P_1, ..., P_m)_2' \xrightarrow{G_M} (P_{1M}, ..., P_{mM})_2' \xrightarrow{G_B}$$
$$(Q_{1M})_2' \xrightarrow{G_M^{-1}} (Q_1)_A,$$

where $G_P$ is a projection transformation, $G_B$ is a balanced-brightness transformation, $G_M$ is a masking transformation, and $(P_1,P_2,Q_1)_A$ are three primary color coordinates of the anaglyph. Herein the mask image $\{M_1, ..., M_m, M_Q\}$ is called masking data M. In general, the masking data M may contain parameter values for masking functions $M_g$ and $M_Q$ where the masking transformation $G_M$ comprises the masking functions $M_g$ and $M_Q$. Herein $G_M$ may be conceptually considered as a part of the $G_P$ transformation and $G_M^{-1}$ may be considered as part of the $G_B$ transformation.

Creating True-Depth Anaglyphs

Generally, anaglyphs of the present invention with balanced brightness may be created in two stages. The first stage concerns determining the parameters of a balanced-brightness transformation $G_B$. Herein these parameters are called brightness transformation data or $G_B$ data. The second stage concerns using the $G_B$ data to create balanced-brightness anaglyphs from stereoscopic image pairs. In theory, the $G_B$ data only needs to be determined once for a display apparatus. The $G_B$ data may be stored and used repeatedly to create balanced-brightness anaglyphs. However, a range of $G_B$ data may be selectable by the user to suit a user's preferences. The relative brightness of the first and second images may be selectable by a user. The first image may be selectable as the left or right eye image by a user. Furthermore the projection transformation $G_P$ may contain a set of parameters which may affect the color distribution in the displayed anaglyphs. Herein these parameters are called $G_P$ data. Generally, the $G_P$ data may be selectable by a user. Herein the $G_P$ data may include: the relative brightness of the first and second images; which of the left or right images is the first image of the anaglyph; and the method of projecting the initial primary color into the primary colors of the first image of an anaglyph.

Generally software may be used to help determine the $G_B$ data and to create balanced-brightness anaglyphs. A software program may provide tools which help determine the $G_B$ data for a certain display. A software program may provide tools which help create anaglyphs using the $G_B$ data. A software program may provide tools which allow the $G_P$ data to be selected by a user. A display apparatus may comprise $G_B$ data in the apparatus which may be used to create balanced brightness anaglyphs without requiring the user to determine the $G_B$ data. A display apparatus may comprise transformations $G_P$ and/or $G_B$ for creating anaglyphs with balanced brightness from full-color stereoscopic images.

Figure 9:
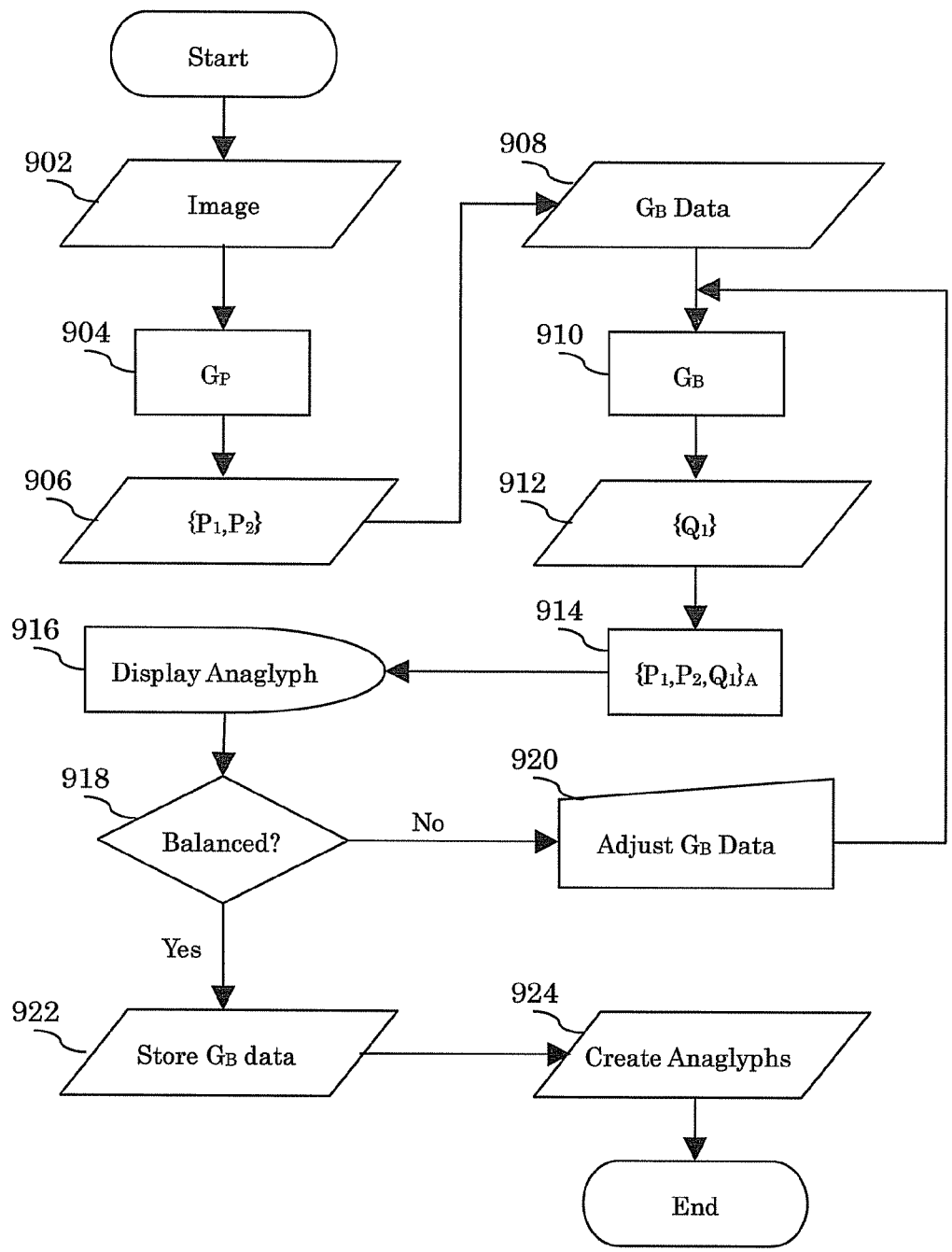
FIG. 9 depicts a method of calibrating the brightness transformation $G_B$ in order to create three-color anaglyphs with balanced brightness.

FIG. 9 depicts a flowchart of the process of determining the $G_B$ data for three-color anaglyphs. The display apparatus provides two primary colors $\{P_1,P_2\}$ for displaying the first image of an anaglyph and a primary color $\{Q_1\}$ for displaying the second image of an anaglyph; and includes: a first viewing filter for viewing the $\{P_1,P_2\}$ primary colors; and a second viewing filter for viewing the $\{Q_1\}$ primary color. The process comprises the following steps: (1) reading the coordinate values of a test image 902; (2) projecting the image coordinate values into the $\{P_1,P_2\}$ primary colors using a $G_P$ transformation 904, 906; (3) selecting initial $G_B$ data 908; (4) calculating the $\{Q_1\}$ coordinate values using the $G_B$ data and $G_B$ transformation 908, 910, 912; (5) creating an anaglyph from the $\{P_1,P_2\}$ and $\{Q_1\}$ values 914; (6) displaying the anaglyph 916; (7) viewing the anaglyph through the first and second filters 918; and (8) if the anaglyph has balanced brightness contrast the $G_B$ data may be stored 922 and used to create anaglyphs 924; if the anaglyph does not have balanced brightness contrast, the $G_B$ data may be adjusted 920 and new $\{Q_1\}$ values may be calculated using the new $G_B$ data 920, 910, 912.

Figure 10:
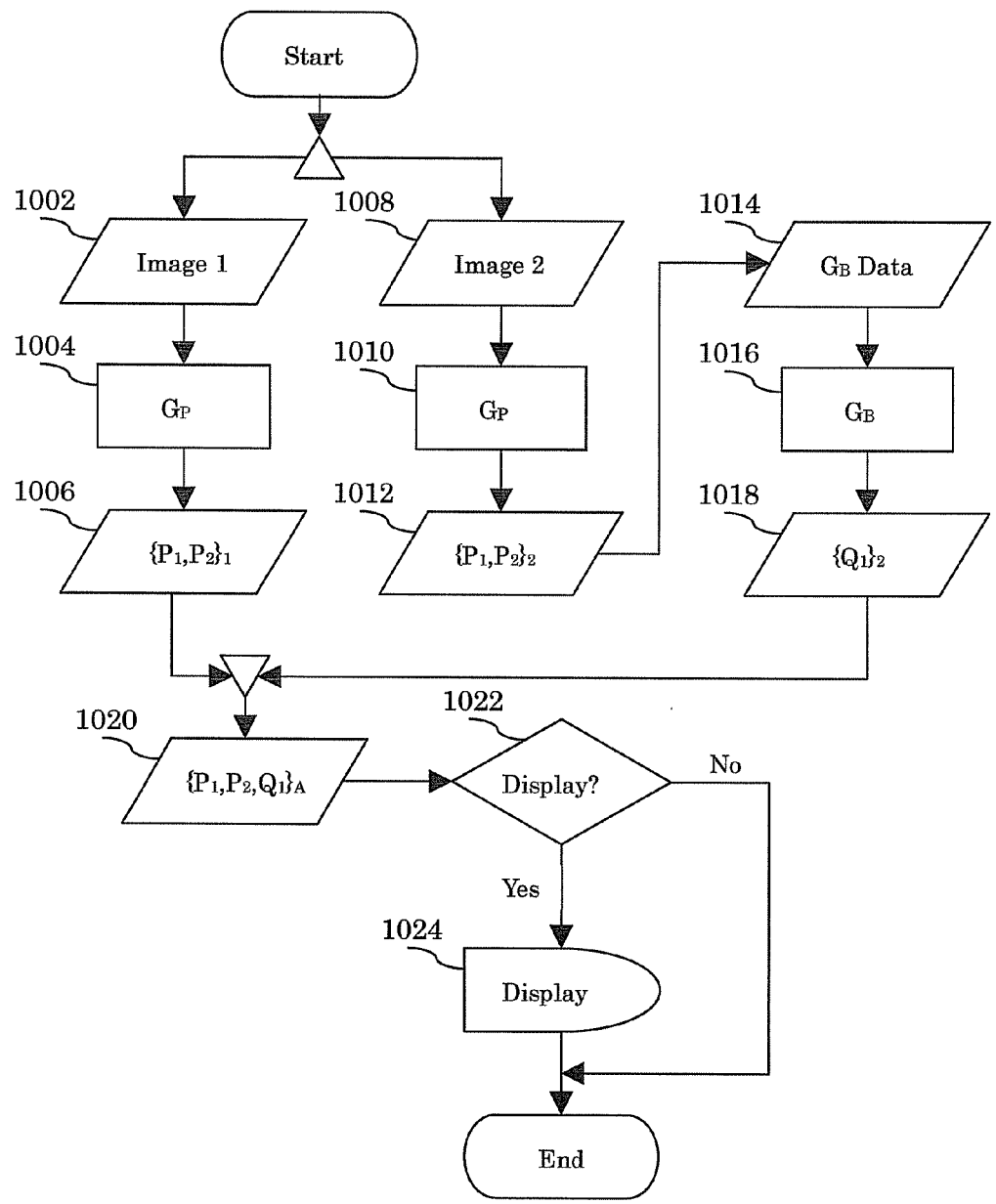
FIG. 10 depicts a method creating three-color, balanced-brightness anaglyphs using a brightness transformation $G_B$.

FIG. 10 depicts a flowchart of the process of creating and displaying three-color, balanced-brightness anaglyphs using stored $G_B$ data. The flowchart depicts the first and second images being processed in parallel, however they may also be processed sequentially. The process comprises the following steps: (1) reading the first image coordinate values 1002; (2) projecting the first image coordinate values into the $\{P_1,P_2\}_1$ primary colors using a $G_P$ transformation 1004, 1006; (3) reading the second image coordinate values 1008; (4) projecting the second image coordinate values into the $\{P_1,P_2\}_2$ primary colors using a $G_P$ transformation 1010, 1012; (5) reading the $G_B$ data 1014; (6) calculating the $\{Q_1\}_2$ coordinate values using the $G_B$ data and the $G_B$ transformation 1014, 1016, 1018; (7) creating an anaglyph from the $\{P_1,P_2\}_1$ and $\{Q_1\}_2$ values 1020; (8) displaying the anaglyph if desired 1022, 1024. The anaglyph $\{P_1,P_2,Q_1\}$ may also be stored in a digital file. A display apparatus performing this process may usually display the anaglyphs. A software program performing this process may usually store or display the anaglyphs.

Figure 11:
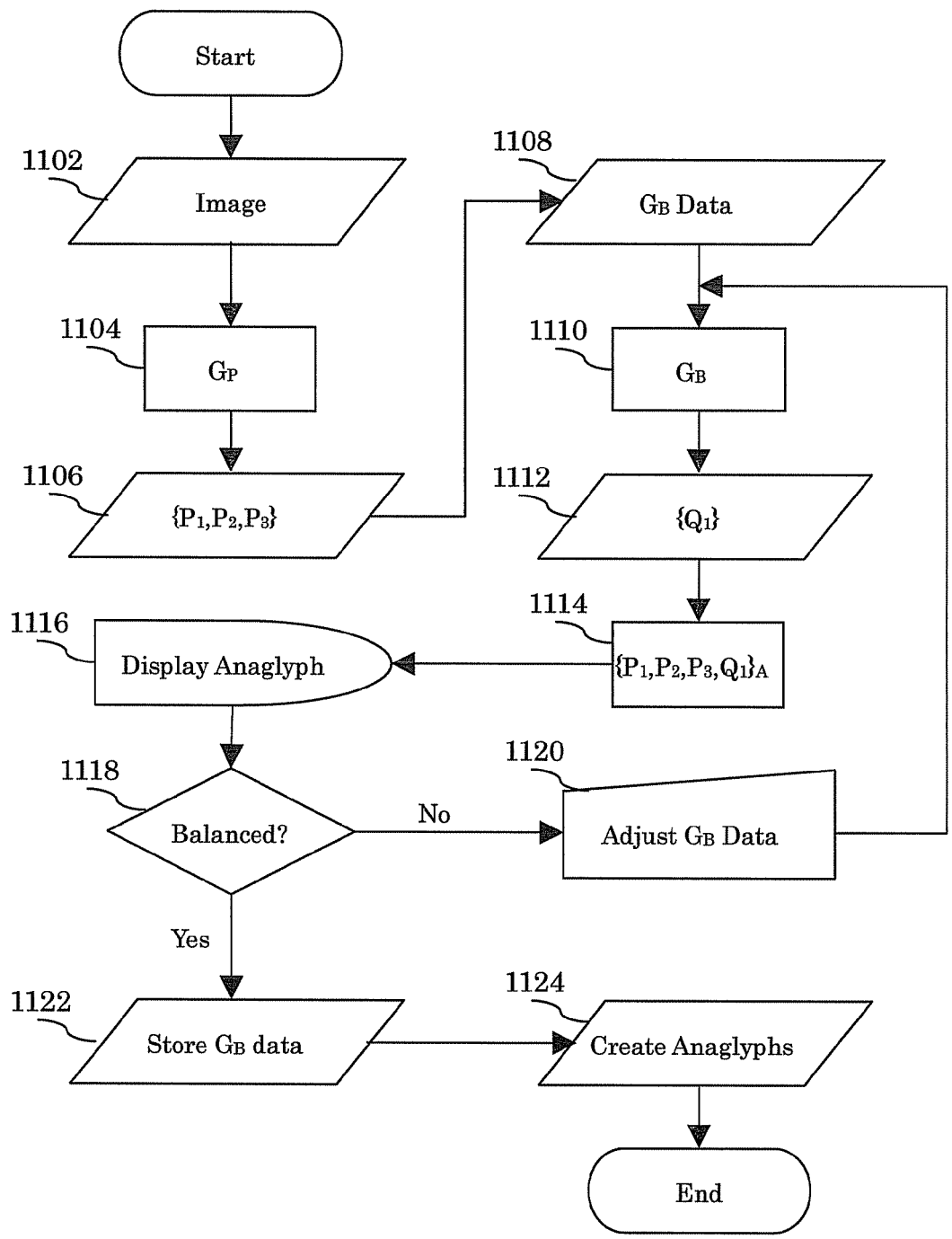
FIG. 11 depicts a method of calibrating the brightness transformation $G_B$ in order to create four-color anaglyphs with balanced brightness.

FIG. 11 depicts a flowchart of the process of determining the $G_B$ data for four-color anaglyphs. The display apparatus provides three primary colors $\{P_1,P_2,P_3\}$ for displaying the first image of an anaglyph and a primary color $\{Q_1\}$ for displaying the second image of an anaglyph; and includes: a first viewing filter for viewing the $\{P_1,P_2,P_3\}$ primary colors; and a second viewing filter for viewing the $\{Q_1\}$ primary color. The process comprises the following steps: (1) reading the coordinate values of a test image 1102; (2) projecting the image coordinate values into the $\{P_1,P_2,P_3\}$ primary colors using a $G_P$ transformation 1104, 1106; (3) selecting initial $G_B$ data 1108; (4) calculating the $\{Q_1\}$ coordinate values using the $G_B$ data and $G_B$ transformation 1108, 1110, 1112; (5) creating an anaglyph from the $\{P_1,P_2,P_3\}$ and $\{Q_1\}$ values 1114; (6) displaying the anaglyph 1116; (7) viewing the anaglyph through the first and second filters 1118; and (8) if the anaglyph has balanced brightness contrast the $G_B$ data may be stored 1122 and used to create anaglyphs 1124; if the anaglyph does not have balanced brightness contrast, the $G_B$ data may be adjusted 1120 and new $\{Q_1\}$ values may be calculated using the new $G_B$ data 1120, 1110, 1112.

Figure 12:
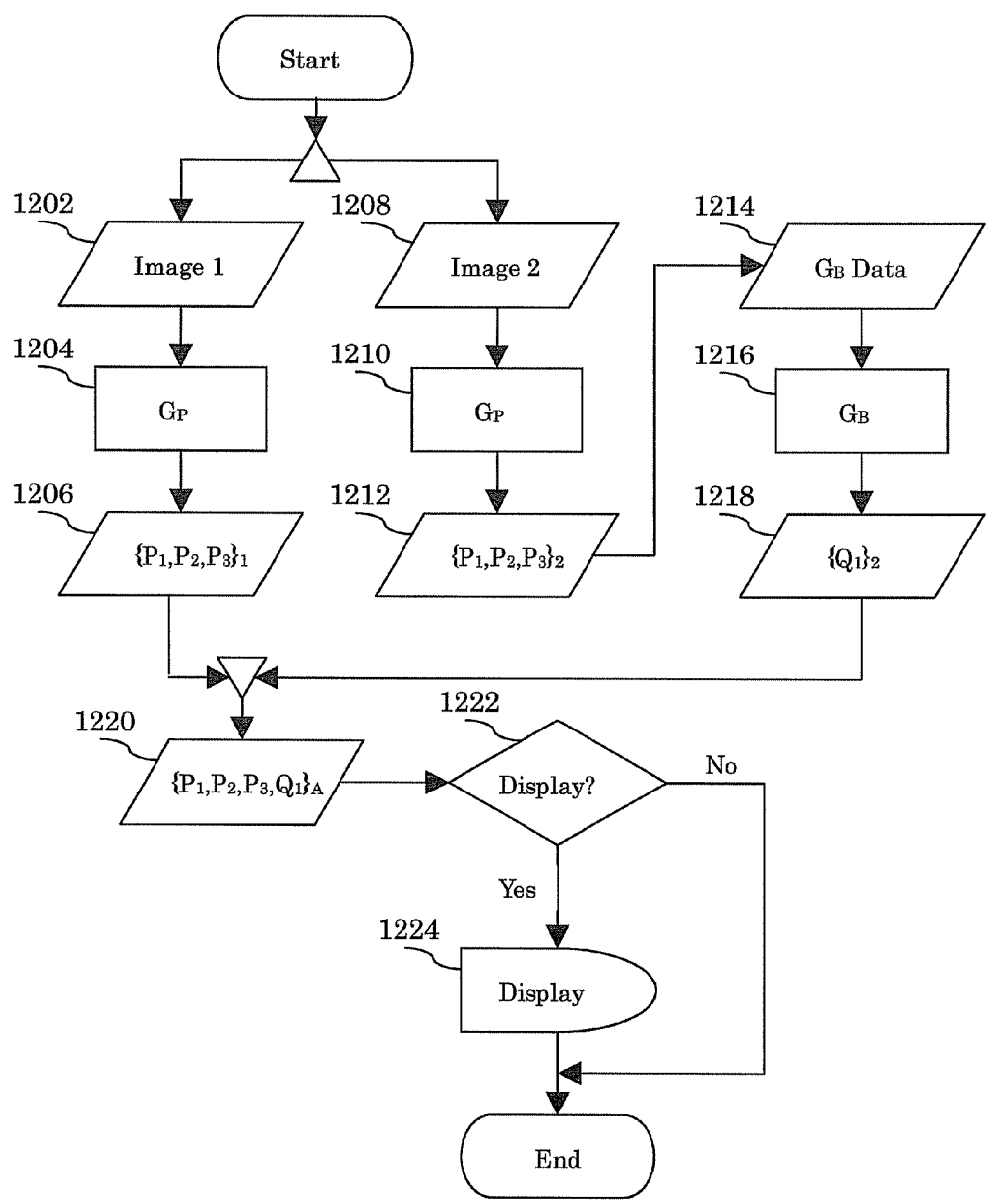
FIG. 12 depicts a method of creating four-color, balanced-brightness anaglyphs using a brightness transformation $G_B$.

FIG. 12 depicts a flowchart of the process of creating and displaying four-color, balanced-brightness anaglyphs using stored $G_B$ data. The flowchart depicts the first and second images being processed in parallel, however they may also be processed sequentially. The process comprises the following steps: (1) reading the first image coordinate values 1202; (2) projecting the first image coordinate values into the $\{P_1,P_2,P_3\}_1$ primary colors using a $G_P$ transformation 1204, 1206; (3) reading the second image coordinate values 1208; (4) projecting the second image coordinate values into the $\{P_1,P_2,P_2\}_2$ primary colors using a $G_P$ transformation 1210, 1212; (5) reading the $G_B$ data 1214; (6) calculating the $\{Q_1\}_2$ coordinate values using the $G_B$ data and the $G_B$ transformation 1214, 1216, 1218; (7) creating an anaglyph from the $\{P_1,P_2,P_3\}_1$ and $\{Q_1\}_2$ values 1220; (8) displaying the anaglyph if desired 1222, 1224. The anaglyph $\{P_1,P_2,P_3,Q_1\}$ may also be stored in a digital file. A display apparatus performing this process may usually display the anaglyphs. A software program performing this process may usually store or display the anaglyphs.

A digital file may be used to store the anaglyphs of the present invention with four or more color values $\{P_1, \ldots, P_m, Q_1\}$ as an array of m+1 color coordinates representing the color coordinates of each pixel point j in a digital image $\{P_1, \ldots, P_m, Q_1\}_j$. Alternatively the anaglyph may be stored in m+1 arrays of coordinates $\{P_1\}_j, \ldots, \{P_m\}_j, \{Q_1\}_j$. Alternatively the anaglyph may be stored in two arrays of coordinates $\{P_{1j}, \ldots, P_m\}_j, \{Q_1\}_j$. The digital file of the present invention may be compressed by methods of the prior art.

For purposes of clarity, the following notations may be used: (1) the first image coordinates $(P_1, \ldots, P_s)_1$ may be expressed as coordinates $A_{1j}, \ldots, A_{sj}$ wherein j comprises an index of points in the first image; (2) the second image coordinates $(P_1, \ldots, P_s)_2$ may be expressed as coordinates $B_{1k}, \ldots, B_{sk}$ wherein k comprises an index of points in the second image; (3) the coordinates $(P_1, \ldots, P_m)_1{'}$ may be expressed as $P_{1j}, \ldots, P_{mj}$; and (4) the coordinates $(P_1, \ldots, P_m)_2{'}$ may be expressed as $P_{1k}, \ldots, P_{mk}$. The symbols "P", "(P)'", "A", and "B" are general coordinate labels which may be assigned various physical attributes such as red, green, blue, yellow, ..., etc. in a particular implementation. It will be understood by one skilled in the art that various symbols may be used as general coordinate labels to convene identical meaning. The relevant common features of the notations are: (1) the integers "s" and "m" which provide reference to the number of channels; and (2) the index symbols "j" and "k" or subscripted symbols "1" and "2", which provide reference to the first image and the second image respectively. Therefore symbols "j" and "k" may have the assigned physical attributes of describing either the first image or the second image whereas symbols "A" and "B" may be assigned various physical attributes of the first and second images respectively.

Control of Retinal Rivalry

In some embodiments of the present invention, the difference in brightness contrast between the first and second images may be used to define a measure of retinal rivalry in an anaglyph image. A measure of retinal rivalry may allow the retinal rivalry to be controlled across the entire anaglyph image for all colors. A certain low amount of retinal rivalry may be used to increase the color gamut of some anaglyphs. In contrast in the prior art, the reduction of retinal rivalry over some regions of an anaglyph may create high levels of retinal rivalry in other regions of the anaglyph.

The methods of creating balanced brightness anaglyphs described herein provide a method of determining the values of $Q_1$ in the anaglyph. The resulting $Q_1$ values may be approximations of the ideal values $Q_1{'}$ that truly balance the brightness contrast in the anaglyph. The difference in the calculated values $Q_1$ and the ideal values $Q_1{'}$ may be used to create a measure of the retinal rivalry Z' of the stereo view or anaglyph:

$$Z' = |Q_1 - Q_1{'}|/Q_1$$

where the $(Q_1-Q_1{'})$ factor is proportional to the retinal rivalry and the $1/Q_1$ factor is a normalization factor. Calculating Q' may require an exact model of the brightness of a color. However, $Q_1{'}$ may also be approximated by models which determine the values of $Q_{1B}$ which minimize retinal rivalry.

One embodiment of the present invention provides a method to measure the retinal rivalry Z in an anaglyph using the difference $Q_1 - Q_{1B}$ in the actual $Q_1$ values in an anaglyph from the values $Q_{1B}$ calculated by a particular method to minimize the retinal rivalry in an image:

$$Z_\lambda = |Q_1 B - \lambda Q_1|/Q_1 B$$

where λ is a scaling ratio which may take into account a different scaling between $Q_1$ and $Q_{1B}$. The $(Q_{1B}-\lambda Q_1)$ factor may be proportional to the retinal rivalry. The $1/Q_1$ factor is a normalization factor. In general, λ may be selected to minimize the average $Z_\lambda$ over an anaglyph image. Or if the scaling ratio is known, λ may be set to the scaling ratio value. Then the minimum of $Z_\lambda$ may be a measure of the retinal rivalry, $Z = MIN_\lambda(Z_\lambda)$:

$$Z = MIN_\lambda(|Q_1 B - \lambda Q_1|/Q_1 B).$$

Once λ is determined, Z may be written without loss of generality as:

$$Z = |Q_1 B - Q_1|/Q_1 B.$$

Z is a color coordinate unique to stereoscopic images which may be used to measure the retinal rivalry of like subject matter in an anaglyph image. Herein, Z is called the retinal rivalry coordinate.

The retinal rivalry coordinate Z may be used to compare various methods of creating anaglyphs including methods of the prior art. In order to determine Z, the balanced brightness values $Q_{1B}$ may be determined by a selected method. The more accurately $Q_{1B}$ is determined, the more accurately Z measures the retinal rivalry. If the $\{P_1, \ldots, P_m\}_2$ coordinates of the second image are known, Z may be determined in a straight forward way. The $\{P_1, \ldots, P_m\}_2$ coordinates of the second image may be used to calculate $\{Q_{1B}\}_2$ for the second image. Then Z may be determined by comparing the values of $\{Q_{1B}\}_2$ with the values of $\{Q_1\}_2$ in the anaglyph. If the $\{P_1, \ldots, P_m\}_2$ coordinates of the second image are not known, $\{Q_{1B}\}_1$ may be calculated using the values of $\{P_1, \ldots, P_m\}_1$ from the first image for like subject matter in the second image. Then Z may be determined from the values of $\{Q_{1B}\}_1$ for the first image and the values of $\{Q_1\}_2$ in the second image.

The retinal rivalry coordinate Z of the present invention may be used to: (1) determine an average retinal rivalry in an anaglyph; (2) determine the maximum values of retinal rivalry in an anaglyph; and (3) determine a distribution of retinal rivalry in an anaglyph image. These tools may be provided in a software program.

Another measure of the retinal rivalry is:

$$Z_s = MIN_\lambda((Q_1 B - \lambda Q_1)/Q_1 B)$$

where λ may be chosen to minimize the average magnitude of $Z_s$ over an image. Once λ is determined, $Z_s$ may be written without loss of generality as:

$$Z_s = (Q_1 B - \lambda Q_1)/Q_1 B.$$

$Z_s$ contains the sign of the retinal rivalry coordinate, $Z = |Z_s|$. In general a measure Z of retinal rivalry can be any function of $Z_s$ $$Z = G(Z_s).$$

Some embodiments of the present invention provide methods to increase the color gamut observed in an anaglyph image by using selected amounts of retinal rivalry. One of the problems with anaglyphs of the prior art is that they may contain retinal rivalry that is uneven over the image, and they often contain high levels of retinal rivalry for some hues. In one embodiment of the present invention, the $Z_s$ coordinate may be used to create anaglyph images with a controlled amount of retinal rivalry. First a method may be used to determine a balanced brightness $Q_{1B}$ coordinate. Then the values of $Z_s$ may be selected over the image. Herein, the selected values of $Z_s$ are called the rivalry data or $Z_s$ data. The values of $Q_{1B}$ determined by a brightness transformation $G_B$ may be transformed into the $Q_1$ values of an anaglyph with a selected amount of retinal rivalry using a rivalry transformation $G_Z$. $G_Z$ may be written as follows:

$$Q_1 = (1-Z_s)Q_{1B}$$

where $\lambda=1$ since $Q_1$ and $Q_{1B}$ may have the same scale. The rivalry data $Z_s$ may be a user selectable constant or a user selectable function of any color property or coordinate or region of the image. A positive $Z_s$ values may generally enhance the observed saturation of hues in the first image. A large negative $Z_s$ values may generally add the hues associated with the $Q_1$ primary color to the observed color gamut in the stereo view. The $Z_s$ data may be varied selectively in order to add hues to various areas of an anaglyph image.

A display apparatus may comprise rivalry data $Z_s$. The rivalry data $Z_s$ in a display apparatus may be selected from a range by the user according to a user's preference. Similarly, a software program may comprise data $Z_s$. The rivalry data $Z_s$ in a software program may be selected from a range by the user according to a user's preference.

One embodiment of the present invention includes methods for creating anaglyphs with a selected amount of retinal rivalry using a rivalry transformation $G_Z$ comprising rivalry data $Z_s$. This method may be written as a transform of the first image as follows:

$$(P_1, \ldots, P_s)_1 \xrightarrow{G_P} (P_1, \ldots, P_m)_1' \longrightarrow (P_1, \ldots, P_m)_A,$$

and the transformation of the second image as follows:

$$(P_1, \ldots, P_s)_2 \xrightarrow{G_P} (P_1, \ldots, P_m)_2' \xrightarrow{G_B} (Q_{1B})_2' \xrightarrow{G_Z} (Q_1)_A,$$

where s may be different from m, $G_P$ is a projection transformation, $G_B$ is a balanced-brightness transformation, $G_M$ is a masking transformation, and $(P_1, \ldots P_m, Q_1)_A$ are m+1 primary color coordinates of the anaglyph. Herein $G_Z$ may be conceptually considered as a part of the $G_B$ transformation and $G_M^{-1}$.

Figure 13:
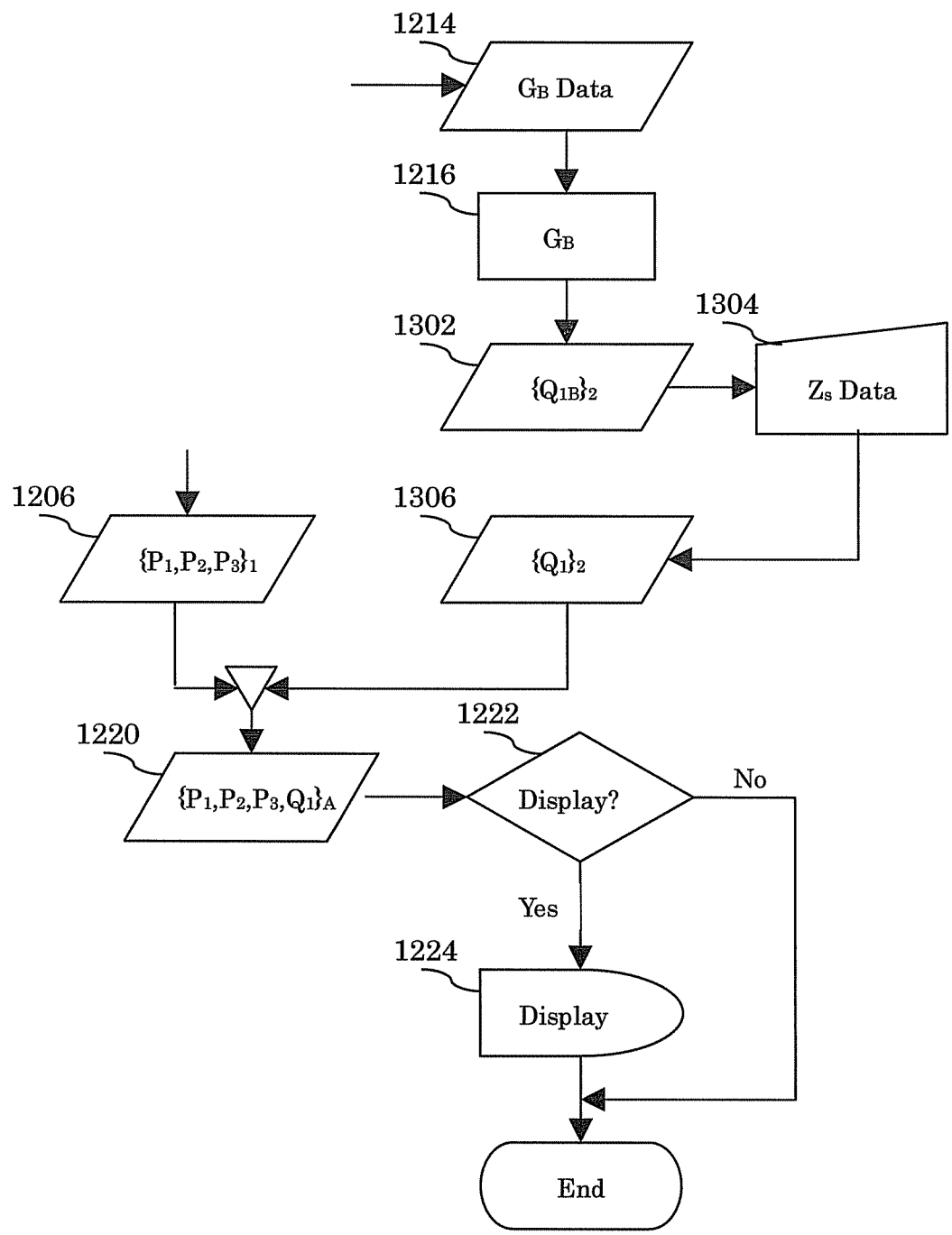
FIG. 13 depicts a modified method of creating three-color anaglyphs in order to provide a controlled amount of retinal rivalry using a brightness transformation $G_B$ and selected retinal rivalry $Z_s$.

FIG. 13 depicts a flowchart of the process of creating and displaying four-color, anaglyphs with a selected amount of retinal rivalry using stored $Z_s$ data. The process includes some of the steps shown in FIG. 12 and not shown in FIG. 13. The process comprises the following steps: (1) reading the first image coordinate values 1202; (2) projecting the first image coordinate values into the $\{P_1, P_2, P_3\}_1$ primary colors using a $G_P$ transformation 1204, 1206; (3) reading the second image coordinate values 1208; (4) projecting the second image coordinate values into the $\{P_1, P_2, P_2\}_2$ primary colors using a $G_P$ transformation 1210, 1212; (5) reading the $G_B$ data 1214; (6) calculating the $\{Q_{1B}\}_2$ coordinate values using the $G_B$ data and the $G_B$ transformation 1214, 1216, 1302; (7) reading the retinal rivalry data 1304; (8) determining the $\{Q_1\}_2$ using the retinal rivalry transformation $G_Z$ 1306; (9) creating an anaglyph from the $\{P_1, P_2, P_3\}_1$ and $\{Q_1\}_2$ values 1220; (8) displaying the anaglyph if desired 1222, 1224. The anaglyph $\{P_1, P_2, P_3, Q_1\}$ may also be stored in a digital file. A display apparatus performing this process may usually display the anaglyphs. A software program performing this process may usually store or display the anaglyphs.

The methods of the present invention to control retinal rivalry may be used to broaden the color gamuts of three-color anaglyphs. Using positive $Z_s$ near the white point may enhance the hues which may be de-saturated by the shift in the white point toward the hue. For example, in a red/cyan anaglyph, using positive $Z_s$ for the cyan and green hues may cause the appearance of the cyan hue and an increased saturation of the green hues near cyan. Using negative $Z_s$ near the blue or yellow hues may shift these hues toward purple and orange hues respectively.

Figure 14:
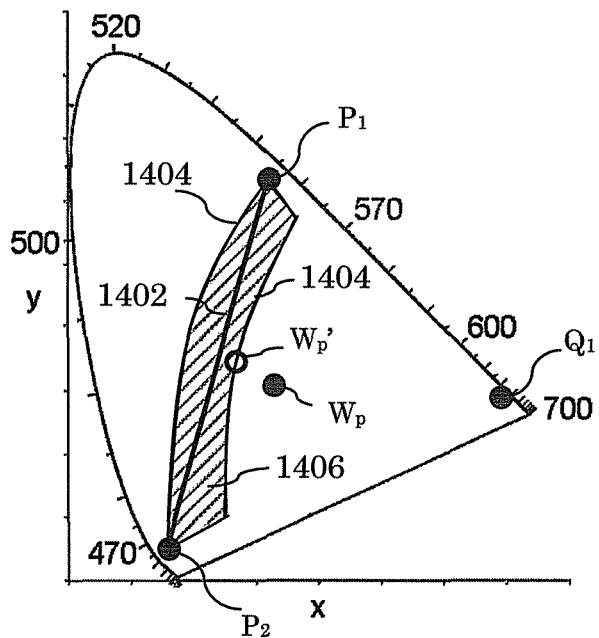
FIG. 14 depicts a representative color gamut of an anaglyph with a selected amount of retinal rivalry in which the second image of the anaglyph is rendered in a red $Q_1$ primary color and the first image is rendered in green $P_2$, and blue $P_3$ primary colors.

FIG. 14 depicts the color gamut 1406 of a red/cyan anaglyph with a selected range of retinal rivalry $Z_s$. The color gamut for the case of no retinal rivalry $Z_s=0$ is shown as a one-dimensional line segment 1402 joining the $P_1$ and $P_2$ primary colors. A upper limit of the selected $Z_s$ (positive $Z_s$) is shown as a curve 1404 on the green and cyan side of the no-rivalry line segment 1404. The positive values of $Z_s$ may be used to increase the saturation of the green and cyan hues in the color gamut due the increased distance from the apparent white point $W_p'$ viewed through the first viewing filter. The lower limit of the selected $Z_s$ (negative $Z_s$) is shown as a curve 1404 on the red side of the no-rivalry line segment 1404. The negative values or $Z_s$ may be used to improve the yellow hues and add purple hues to the color gamut of the anaglyph. FIG. 14 depicts the combined effects of using both positive and negative $Z_s$ to expand the color gamut of anaglyph images. Similarly, selected amounts of retinal rivalry may be used to expand the color gamut observed in blue/yellow and green/magenta anaglyphs and in four-color anaglyphs.

One aspect of the present invention is a software program which provides methods to measure the retinal rivalry in anaglyph image. One aspect of the present invention is a software program which provides tools to create anaglyphs with selected amounts of retinal rivalry. One aspect of the present invention is a software program which provides tools for measuring the retinal rivalry of existing anaglyphs. One aspect of the present invention is a display apparatus which comprises Z data. One aspect of the present invention is a display apparatus which allows the Z data to selected from a range by the user.

Subtractive Primary Colors

In applying the balanced brightness condition to printed anaglyph images, the brightness property may be determined for subtractive primary color values. The dependence of the brightness on subtractive primary colors may be determined by converting the subtractive primary values $\{mP_1, \ldots, mP_s\}$ into additive primary color values $\{P_1, \ldots, P_m\}$. The number of subtractive primary colors may be different from the number of additive colors. If the images are originally in additive color coordinates, the additive color coordinate values may be transformed into the gamut of the subtractive primary colors. Then the additive primary colors may be used to determine a $Q_1$ primary color value. Then the $Q_1$ primary color values may be transformed into the subtractive primary color values.

As noted above, the present invention is applicable to software, display apparatus and special filters and is believed to be particularly useful for creating, displaying and viewing digital anaglyph images with wide color gamuts without retinal rivalry or with a selectable amount of retinal rivalry. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A method for generating a color anaglyph image for display using a display apparatus, comprising:
   providing a stereoscopic image, comprising:
      a first image represented by two or more color coordinates $A_{1j}, \ldots, A_{sj}$, wherein j comprises an index of points in the first image; and
      a second image represented by two or more color coordinates $B_{1k}, \ldots, B_{sk}$, wherein k comprises an index of points in the second image;
   using a first transformation, transforming the coordinates $A_{1j}, \ldots, A_{sj}$ into m first color coordinates $P_{1j}, \ldots, P_{mj}$, wherein m comprises a positive integer of at least two, said first transformation determining hues of the anaglyph, wherein coordinates $P_{1j}, \ldots, P_{mj}$ comprise a substantial range of saturation of m or more hue components;
   using a second transformation, transforming the color coordinates $B_{1k}, \ldots, B_{sk}$ into coordinates $Q_{1k}$; and
   constructing a first color anaglyph image from said m+1 coordinates $P_{1j}, \ldots, P_{mj}$, and coordinates $Q_{1k}$,
   wherein a first retinal rivalry $Z_{1k}$ of the first color anaglyph is substantially low, said first retinal rivalry $Z_{1k}$ represented by $/Q_{1k} - Y_{1j}/$ for like subject matter in said first image and said second image,
   wherein coordinates $Y_{1j}$ are a function of coordinates $P_{1j}, \ldots, P_{mj}$ and represent the relative brightness of the coordinates $P_{1j}, \ldots, P_{mj}$ provided by the display apparatus.

2. The method of claim 1, wherein the first color anaglyph comprises a color $/P_{1j} - P_{mj}/$ to retinal rivalry ratio exceeding four to one.

3. The method of claim 1, wherein coordinates $Q_{1k}$ are substantially described by a function $Y_{1j}$ of the coordinates $P_{1j}, \ldots, P_{mj}$ for like subject matter in said first image and said second image.

4. The method of claim 1, wherein second brightness represented in the coordinates $Q_{1k}$ is substantially proportional to first brightness represented in the coordinates $P_{1j}, \ldots, P_{mj}$ for like subject matter in the first image and the second image.

5. The method of claim 3, said function $Y_{1j}$ represented by:

$$Y_{1j} = (\alpha_1 P_{1j}^{y_1} + \ldots + \alpha_m P_{mj}^{y_m})^{1/y},$$

wherein parameters $\alpha_1, \ldots, \alpha_m$ represent the relative brightness of the values $P_{1j}^{y_1}, \ldots, P_{mj}^{y_m}$, respectively, and wherein parameters Y and $Y_1, \ldots, Y_m$ represent the non-linearity of a display apparatus.

6. The method of claim 3, said transforming the coordinates $B_{1k}, \ldots, B_{sk}$ into the coordinates $Q_{1k}$ using said second transformation comprising:
   using said first transformation, transforming the coordinates $B_{1k}, \ldots, B_{sk}$ into second color coordinates $P_{1k}, \ldots, P_{mk}$; and
   using a third transformation, transforming second color coordinates $P_{1k}, \ldots, P_{mk}$ into coordinates $Q_{1k}$.

7. The method of claim 1, wherein relative brightness represented in the coordinates $P_{1j}, \ldots, P_{mj}$ is substantially proportional to the relative brightness represented in the coodinates $A_{1j}, \ldots, A_{sj}$.

8. The method of claim 1, said second transformation comprising:
   transforming the coordinates $B_{1k}, \ldots, B_{sk}$ into coordinates $Q_{1Bk}$ using a third transformation that reduces retinal rivalry of a second anaglyph represented by coordinates $P_{1j}, \ldots, P_{mj}$ and $Q_{1Bk}$; and
   transforming coordinates $Q_{1Bk}$ into coordinates $Q_{1k}$ using a fourth transformation that increases the retinal rivalry of the first color anaglyph relative to the second anaglyph.

9. The method of claim 1, said second transformation comprising:
   transforming coordinates $B_{1k}, \ldots, B_{sk}$ into coordinates $Q_{1Bk}$ using a third transformation that reduces the retinal rivalry of a second anaglyph represented by coordinates $P_{1j}, \ldots, P_{mj}$ and $Q_{1Bk}$; and
   transforming coordinates $Q_{1Bk}$ into coordinates $Q_{1k}$ using a fourth transformation that decreases the retinal rivalry of the first color anaglyph relative to the second anaglyph, said fourth transformation descriptive of the dependence of perceived brightness of a hue in the second image on surrounding hues in the second image.

10. The method of claim 1, further comprising:
    providing primary colors $P_{1j}, \ldots, P_{mj}$ and primary color $Q_{1k}$ using a display apparatus;
    rendering the first color coordinates $P_{1j}, \ldots, P_{mj}$ in the primary colors $P_{1j}, \ldots, P_{mj}$; and
    rendering the coordinates $Q_{1k}$ in the primary color $Q_{1k}$.

11. The method of claim 10, further comprising:
    providing a first viewing filter configured for viewing the first image with a first eye, said first filter transmitting:
       first values $P_{1j}, \ldots, P_{mj}$ of primary colors $P_{1j}, \ldots, P_{mj}$; and
       second values $Q_{1k}$ of primary color $Q_{1k}$, wherein the total luminance of second values $Q_{1k}$ is substantially less than the total luminance of first values $P_{1j}, \ldots, P_{mj}$; and
    providing a second viewing filter configured for viewing the second image with a second eye, said second filter transmitting:
    third values $P_{1j}, \ldots, P_{mj}$ of primary colors $P_{1k}, \ldots, P_{mk}$; and
    fourth values $Q_{1k}$ of primary color $Q_{1k}$, wherein the total luminance of third values $P_{1j}, \ldots, P_{mj}$ is substantially less than the total luminance of fourth values $Q_{1k}$.

12. The method of claim 1, further comprising:
    transferring the first coordinates $P_{1j}, \ldots, P_{mj}$ and the coordinates $Q_{1k}$ to an apparatus comprising at least one of:
    a digital storage device; and
    a digital display device.

13. A color anaglyph rendering of a stereoscopic image, comprising:
    a first image, the first image comprising m first measurable color coordinates $P_{1j}, \ldots, P_{mj}$, wherein j comprises an index of points in the first image, wherein m comprises a positive integer of at least two; and
    a second image, the second image comprising second measurable color coordinates $Q_{1k}$, wherein k comprises an index of points in the second image,
       the coordinates $P_{1j}, \ldots, P_{mj}$ comprising a substantial range of m or more hue components,
    the first image configured for viewing through a first viewing filter, the first filter transmitting values $P_{1j}, \ldots, P_{mj}$ of the coordinates $P_{1j}, \ldots, P_{mj}$,
    the second image configured for viewing through a second viewing filter, the second filter transmitting values $Q_{1k}$ of the primary colors coordinates $Q_{1k}$,
    wherein retinal rivalry $Z_{1k}$ is substantially low in the color anaglyph rendering, said retinal rivalry represented by $/Q_{1k} - Y_{1j}/$ for like subject matter in said first image and said second image, wherein coordinates $Y_{1j}$ are a function of coordinates $P_{1j}, \ldots, P_{mj}$ and represent the relative brightness of the coordinates $P_{1j}, \ldots, P_{mj}$ provided by the display apparatus.

14. The anaglyph rendering of claim 13, further comprising:
said function $Y_{1j}$ being substantially represented by $$Y_{1j} = (\alpha_1 P_{1j}^{y_1} + \ldots + \alpha_m P_{mj}^{y_m})^{1/y},$$

wherein parameters $\alpha_1, \ldots, \alpha_m$ represent the relative brightness of the values $P_{1j}Y^1, \ldots, P_{mj}Y^m$ respectively; and wherein parameters Y and $Y_1, \ldots, Y_m$ represent the non-linearity of the second and first coordinates.

15. An apparatus for displaying stereoscopic images, comprising:
a display apparatus providing:
m primary colors $P_{1j}, \ldots, P_{mj}$ controlled by first coordinates $P_{1j}, \ldots, P_{mj}$, wherein m comprises a positive integer of at least two, and wherein j comprises an index of points of the first image; and
primary color $Q_{1k}$ controlled by coordinates $Q_{1k}$, wherein k comprises an index of points of the second image;
a first transformation;
a second transformation;
said display apparatus configured to:
receive coordinates of a stereoscopic image $A_{1j}, \ldots, A_{sj}$, $B_{1k}, \ldots, B_{sk}$ comprising:
a first image represented by s coordinates $A_{1j}, \ldots, A_{Sj}$; and
a second image represented s by coordinates $B_{1k}, \ldots, B_{sk}$,
wherein s comprises a positive integer of at least three,
wherein the first image comprises substantial red, yellow, green, cyan, blue, and/or magenta hue components, and
wherein the second image comprises substantial red, yellow, green, cyan, blue, and/or magenta hue components;
transform the first image represented by coordinates $A_{1j}, \ldots, A_{sj}$ into coordinates $P_{1j}, \ldots, P_{mj}$ using said first transformation, wherein the coordinates $P_{1j}, \ldots, P_{mj}$ comprise a substantial range of saturation of m or more hue components;
transform the second image represented by coordinates $B_{1k}, \ldots, B_{sk}$ into primary color coordinates $Q_{1k}$ using said second transformation; and
display a color anaglyph image by rendering the first coordinates $P_{1j}, \ldots, P_{mj}$ in the primary colors $P_{1j}, \ldots, P_{mj}$ and rendering the coordinates $Q_{1k}$ in the primary color $Q_{1k}$,
wherein a first retinal rivalry $Z_{1k}$ of the first color anaglyph is substantially low, said retinal rivalry represented by $/Q_{1k}-Y_{1j}/$ for like subject matter in said first image and said second image, wherein coordinates $Y_{1j}$ are a function of coordinates $P_{1j}, \ldots, P_{mj}$ and represent the relative brightness of the coordinates $P_{1j}, \ldots, P_{mj}$ provided by the display apparatus.

16. The apparatus of claim 15, further comprising:
a first viewing filter configured:
to transmit first values $P_{1j}, \ldots, P_{mj}$ of primary colors $P_{1j}, \ldots, P_{mj}$; and
to transmit second values $Q_{1k}$ of primary color $Q_{1k}$, wherein the total luminance of second values $Q_{1k}$ is substantially less than the total luminance of first values $P_{1j}, \ldots, P_{mj}$; and
a second viewing filter configured:
to transmit third values $P_{1j}, \ldots, P_{mj}$ of primary colors $P_{1k}, \ldots, P_{mk}$; and
to transmit fourth values $Q_{1k}$ of primary color $Q_{1k}$, wherein the total luminance of third values $P_{1j}, \ldots, P_{mj}$ is substantially less than the total luminance of fourth values $Q_{1k}$.

17. The apparatus of claim 16, further comprising:
said function $Y_{1j}$ being substantially represented by $$Y_{1j} = (\alpha_1 P_{1j}^{y_1} + \ldots + \alpha_m P_{mj}^{y_m})^{1/y},$$

wherein parameters $\alpha_1, \ldots, \alpha_m$ represent the relative brightness of the values $P_{1j}Y^1, \ldots, P_{mj}Y^m$ respectively; and
wherein parameters Y and $Y_1, \ldots, Y_m$ represent the non-linearity of the second and first coordinates.

18. A method for creating a color anaglyph from a stereoscopic image, comprising:
providing a stereoscopic image comprising:
a first image represented by two or more color coordinates $A_{1j}, \ldots, A_{sj}$, wherein j comprises an index of points in the first image; and
a second image represented by two or more color coordinates $B_{1k}, \ldots, B_{sk}$, wherein k comprises an index of points in the second image;
using a first transformation, transforming the coordinates $A_{1j}, \ldots, A_{sj}$ into m first color coordinates $P_{1j}, \ldots, P_{mj}$, wherein m comprises a positive integer of at least two, said first transformation determining hues of the anaglyph, wherein coordinates $P_{1j}, \ldots, P_{mj}$ comprise a substantial range of saturation of m or more hue components;
using a second transformation, transforming the color coordinates $B_{1k}, \ldots, B_{sk}$ into coordinates $Q_{1k}$; and
constructing a first color anaglyph image from said m+1 coordinates $P_{1j}, \ldots, P_{mj}$, and coordinates $Q_{1k}$,
wherein the first color anaglyph comprises a color $/P_{1j}-P_{mj}/$ to retinal rivalry $Z_{1k}$ ratio exceeding eight to one, said retinal rivalry $Z_{1k}$ represented by $/Q_{1k}-Y_{1j}/$ for like subject matter in said first image and said second image,
wherein coordinates $Y_{1j}$ are a function of coordinates $P_{1j}, \ldots, P_{mj}$ and represent the relative brightness of the coordinates $P_{1j}, \ldots, P_{mj}$.

* * * * *